US009372875B2

(12) United States Patent
Miki et al.

(10) Patent No.: US 9,372,875 B2
(45) Date of Patent: Jun. 21, 2016

(54) IMAGE DATA DISPLAY SYSTEM AND IMAGE DATA DISPLAY PROGRAM

(71) Applicant: Visionarist Co., Ltd., Ikoma-shi, Nara (JP)

(72) Inventors: Sukeichi Miki, Ikoma (JP); Shinichi Miki, Ikoma (JP); Manabu Miki, Ikoma (JP); Hikaru Miki, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 120 days.

(21) Appl. No.: 14/500,328

(22) Filed: Sep. 29, 2014

(65) Prior Publication Data

US 2015/0016752 A1 Jan. 15, 2015

Related U.S. Application Data

(63) Continuation of application No. 13/383,779, filed as application No. PCT/JP2009/062731 on Jul. 14, 2009, now Pat. No. 8,887,053.

(51) Int. Cl.
G06F 3/048 (2013.01)
G06F 17/30 (2006.01)
H04N 5/76 (2006.01)
G06T 1/00 (2006.01)
G06F 3/14 (2006.01)

(52) U.S. Cl.
CPC ............. *G06F 17/3028* (2013.01); *G06F 3/14* (2013.01); *G06F 17/30268* (2013.01); *G06F 17/30274* (2013.01); *G06T 1/00* (2013.01); *H04N 5/76* (2013.01); *G06F 2203/0383* (2013.01)

(58) Field of Classification Search
CPC . G06F 3/0482; G06F 17/30; G06F 17/30056; G06F 17/30598
See application file for complete search history.

(56) References Cited

U.S. PATENT DOCUMENTS

| 5,633,678 | A | 5/1997 | Parulski et al. |
| 6,784,925 | B1 | 8/2004 | Tomat et al. |
| 7,675,553 | B2 | 3/2010 | Kumagai |
| 8,078,618 | B2 | 12/2011 | VanEpps et al. |

(Continued)

FOREIGN PATENT DOCUMENTS

| JP | 2000-83221 A | 3/2000 |
| JP | 2004-297176 A | 10/2004 |

(Continued)

OTHER PUBLICATIONS

International Search Report dated Aug. 11, 2009 with English translation (four (4) pages).

*Primary Examiner* — Dino Kujundzic
(74) *Attorney, Agent, or Firm* — Crowell & Moring LLP

(57) ABSTRACT

An image data display system classifies image data into a cluster based on a predetermined condition regardless of whether or not the image data conforms to DCF standard and displays information specific to the image data when displayed as a slide show. A CPU creates a cluster, including a plurality of the image data, and a slide show table having first and second cluster name candidates based on a FAT data or an Exif data and a third cluster name candidate input by a user. The image display screen combines any two of the above first, second, and third cluster name candidates and displays a list of the combined candidates as cluster names indicating contents of the image data. The user can select the cluster name in high visibility and can easily display the desired image data as the slide show.

8 Claims, 19 Drawing Sheets

(56) References Cited

U.S. PATENT DOCUMENTS

| | | |
|---|---|---|
| 8,538,961 B2 | 9/2013 | Xu et al. |
| 2002/0057851 A1* | 5/2002 | Ohdate ............. G06F 17/30265 382/305 |
| 2003/0156140 A1* | 8/2003 | Watanabe ............. G06F 3/0482 715/810 |
| 2003/0184653 A1 | 10/2003 | Ohkubo |
| 2004/0175764 A1 | 9/2004 | Nishiyama et al. |
| 2004/0205286 A1 | 10/2004 | Bryant et al. |
| 2005/0044091 A1 | 2/2005 | Nakamura et al. |
| 2006/0265425 A1 | 11/2006 | Raff, II et al. |
| 2007/0081088 A1* | 4/2007 | Gotoh ............... G06F 17/30265 348/333.01 |
| 2007/0103565 A1 | 5/2007 | Xu et al. |
| 2007/0171277 A1 | 7/2007 | Shioi et al. |
| 2007/0192741 A1 | 8/2007 | Yoritate et al. |
| 2009/0119596 A1 | 5/2009 | Iwahara et al. |
| 2010/0042926 A1* | 2/2010 | Bull .................. G06F 17/30047 715/732 |
| 2010/0149132 A1 | 6/2010 | Iwase et al. |
| 2010/0275140 A1* | 10/2010 | Ishii .................. G06F 17/30056 715/764 |
| 2011/0289085 A1 | 11/2011 | Shiokawa et al. |

FOREIGN PATENT DOCUMENTS

| | | |
|---|---|---|
| JP | 2005-244614 A | 9/2005 |
| JP | 2007-58792 A | 3/2007 |
| WO | WO 2007/055334 A1 | 5/2007 |

\* cited by examiner

FIG.8

| | 1 | 2 | 3 | 4 | 5 | 6 |
|---|---|---|---|---|---|---|
| CLUSTER NUMBER (31a) | | | | | | |
| FIRST CLUSTER NAME CANDIDATE (31b) | DCIM | 108ABCAA | 109ABCAA | 110XYZAA | 200BIRTH | 300ICHIR |
| CLUSTER TYPE (31c) | DIRECTORY | DIRECTORY | DIRECTORY | DIRECTORY | FAT DATA | EXIF DATA |
| DCF CONFORM/ NONCONFORM (31d) | CONFORM | CONFORM | CONFORM | NONCONFORM | NONCONFORM | NONCONFORM |
| TOTAL NUMBER OF IMAGE DATA (31e) | 296 | 211 | 85 | 56 | 32 | 2 |
| EARLIEST CREATION DATE (31f) | 2008:12:13 | 2008:12:13 | 2009:01:12 | 2006:12:25 | 2009:01:20 | 2009:01:05 |
| EARLIEST CREATION TIME (31g) | 9:38:20 | 9:38:20 | 18:01:06 | 16:30:40 | 8:45:40 | 19:12:30 |
| LATEST CREATION DATE (31h) | 2009:02:05 | 2008:12:31 | 2009:02:05 | 2007:12:25 | 2009:01:20 | 2009:01:07 |
| LATEST CREATION TIME (31i) | 11:23:14 | 23:11:04 | 11:23:14 | 22:15:24 | 19:58:02 | 23:01:21 |
| SECOND CLUSTER NAME CANDIDATE (31j) | '08−'09 | '08/12 | '09/1−2 | '06−'07 | '09/1/20 | '09/01/05−07 |
| THIRD CLUSTER NAME CANDIDATE (31k) | BASIC DIRECTORY | STAY IN HAWAII | — | CHRISTMAS | BIRTHDAY | TAKEN BY ICHIRO |

31

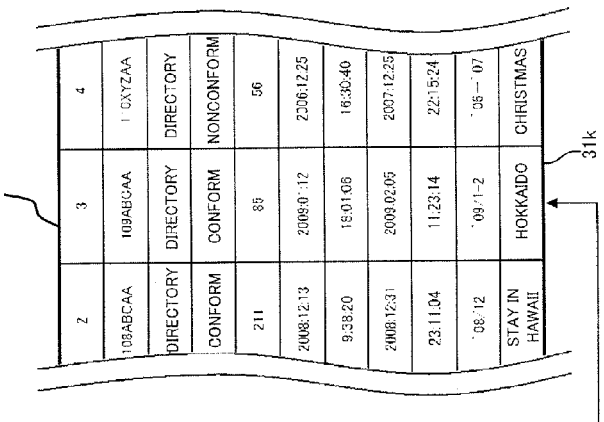
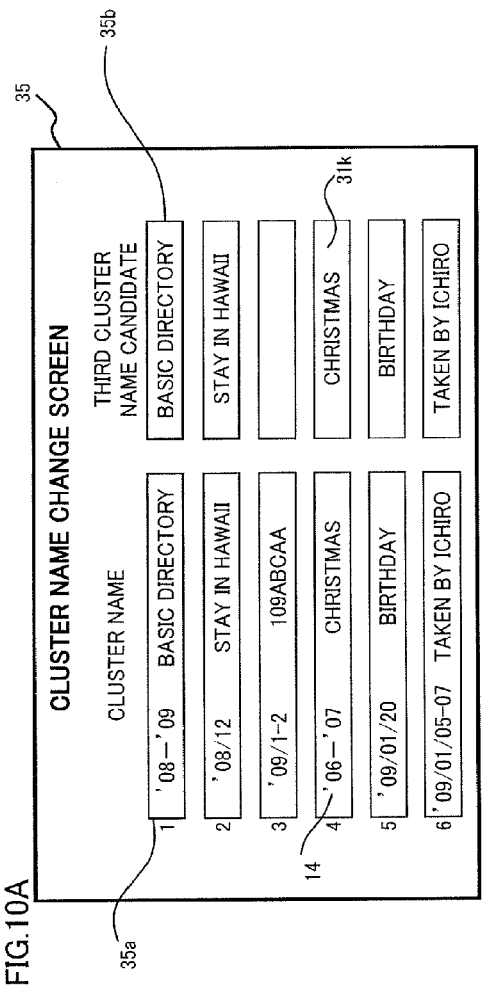
FIG.10A
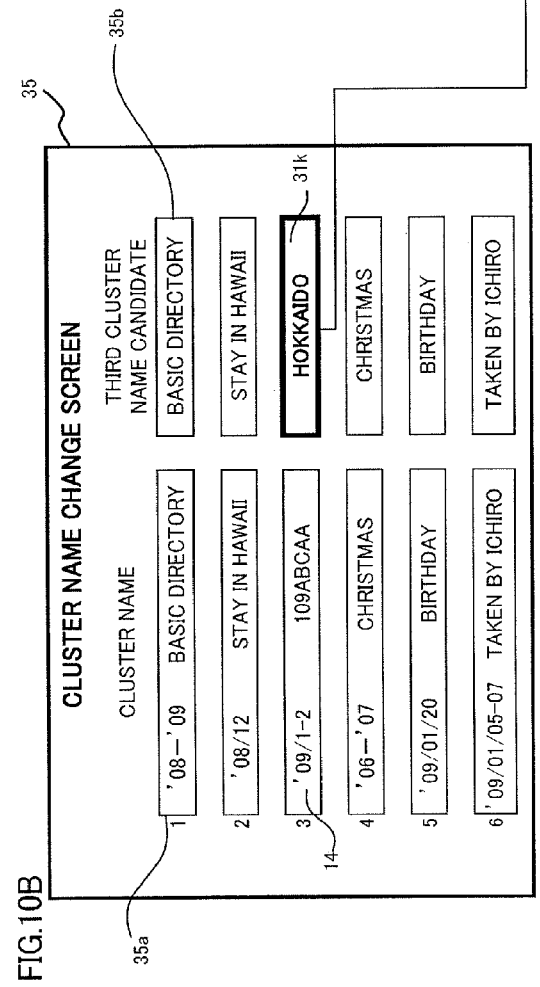
FIG.10B

CLUSTER SELECTION SCREEN

| | CLUSTER NAME | TOTAL NUMBER | AMOUNT OF TIME |
|---|---|---|---|
| 1 | '08 – '09    BASIC DIRECTORY | 296 | 24 MINUTES 40 SECONDS |
| 2 | '08/12    STAY IN HAWAII | 211 | 17 MINUTES 35 SECONDS |
| 3 | '09/1-2    HOKKAIDO | 85 | 7 MINUTES 5 SECONDS |
| 4 | '06-'07    CHRISTMAS | 56 | 4 MINUTES 40 SECONDS |
| 5 | '09/01/20    BIRTHDAY | 32 | 2 MINUTES 40 SECONDS |
| 6 | '09/01/05-07   TAKEN BY ICHIRO | 2 | 10 SECONDS |

FIG.15

| SHOOTING MODE ||SHOOTING MODE CODE|
|---|---|---|
| CATEGORY | MODE NAME | |
| SHOOTING CATEGORY | MACRO | A100 |
| | PERSON | A101 |
| | NIGHT VIEW | A102 |
| | LANDSCAPE | A103 |
| | SPORT | A104 |
| | SELF SHOT | A105 |
| | PERSON | A106 |
| | COOKING | A107 |
| | PARTY | A108 |
| | CANDLE | A109 |
| | SUNSET | A110 |
| | STARRY SKY | A111 |
| | FIRE WORK | A112 |
| | . | . |
| | . | . |
| EVENT CATEGORY | BIRTHDAY | B100 |
| | ATHLETIC FESTIVAL | B101 |
| | TRIP | B102 |
| | . | . |
| | . | . |
| USER SETTING CATEGORY | ICHIRO | C100 |
| | DOG | C101 |
| | . | . |
| | . | . |

| FILE NAME | SHOOTING MODE CODE | SHOOTING MODE |
|---|---|---|
| . | . | . |
| . | . | . |
| P1010590 | A102 | NIGHT VIEW |
| P1010591 | A103 | LANDSCAPE |
| P1010592 | A104 | SPORT |
| P1010593 | A102 | NIGHT VIEW |
| P1010594 | A101 | PERSON |
| P1010595 | A104 | SPORT |
| P1010596 | A102 | NIGHT VIEW |
| P1010597 | A101 | PERSON |
| P1010598 | A102 | NIGHT VIEW |
| P1010599 | A104 | SPORT |
| P1010600 | A102 | NIGHT VIEW |
| . | . | . |
| . | . | . |

FIG.17

| | 1 | 2 | 3 | 4 | 5 | 6 | 7 |
|---|---|---|---|---|---|---|---|
| 31a CLUSTER NUMBER | | | | | | | |
| 31b FIRST CLUSTER NAME | DCIM | 108ABCAA | 109ABCAA | 110XYZAA | 200BIRTH | 400NIGHT | 300ICHIR |
| 31c CLUSTER TYPE | DIRECTORY | DIRECTORY | DIRECTORY | DIRECTORY | FAT DATA | SHOOTING MODE DATA | EXIF DATA |
| 31d DCF CONFORM/ NONCONFORM | CONFORM | CONFORM | NONCONFORM | CONFORM | NONCONFORM | NONCONFORM | NONCONFORM |
| 31e TOTAL NUMBER OF IMAGE DATA | 296 | 211 | 85 | 56 | 32 | 27 | 2 |
| 31f EARLIEST CLUSTER CREATION DATE | 2008:12:13 | 2008:12:13 | 2006:12:25 | 2009:01:12 | 2009:01:20 | 2008:12:19 | 2009:01:05 |
| 31g EARLIEST CLUSTER CREATION TIME | 4:38:20 | 4:38:20 | 16:30:40 | 18:01:06 | 8:45:40 | 20:52:01 | 19:12:30 |
| 31h LATEST CLUSTER CREATION DATE | 2009:02:05 | 2008:12:31 | 2007:12:25 | 2009:02:05 | 2009:01:20 | 2009:01:28 | 2009:01:07 |
| 31i LATEST CLUSTER CREATION TIME | 11:23:14 | 23:11:04 | 22:15:24 | 11:23:14 | 19:58:02 | 22:01:44 | 23:01:21 |
| 31j SECOND CLUSTER NAME | '08 – '09 | '08/12 | '06 – '07 | '09/1-2 | '09/1/20 | '08 – '09 | '09/01/05-07 |
| 31k THIRD CLUSTER NAME | BASIC DIRECTORY | STAY IN HAWAII | CHRISTMAS | HOKKAIDO | BIRTHDAY | NIGHT VIEW | TAKEN BY ICHIRO |

# IMAGE DATA DISPLAY SYSTEM AND IMAGE DATA DISPLAY PROGRAM

CROSS REFERENCE TO RELATED APPLICATIONS

This application is a continuation of U.S. application Ser. No. 13/383,779, which is a National Stage application of PCT/JP2009/062731, filed Jul. 14, 2009, the disclosures of which are expressly incorporated by reference herein.

TECHNICAL FIELD

The present invention relates to an image data display system and an image data display program which can classify a plurality of image data based on a directory or an attribute information regardless of whether or not the image data conform to DCF standard and also can manage the image data in accordance with a cluster name provided to each cluster, so that the plurality of the image data in each cluster desired by a user can be selected and further displayed as a slide show.

BACKGROUND ART

Recently, a price reduction and a capacity increase of a recording medium such as a memory card in accordance with DCF (Design rule for Camera File system) standard cause a user to store large volumes of image data taken by a digital camera. However, in the DCF standard, a strict limitation is imposed on a character string which can be used for a directory name (a folder name) and a file name, so that the user cannot manage the image data under a directory name or a file name which is familiar to the user. Moreover, the directory name and the file name in the DCF standard are designated only by capital alphabetical characters and numeric characters, so that the user cannot visually recognize each directory name or file name easily. Thus, there is a suggestion of a means which enables the user to search and display the directory and the image data easily.

For example, there is a known electronic camera device which associates a user comment, a shooting condition, or the like of an image data with the image data and makes a recording medium store them, and then creates a management file which stores a directory name, which conforms to DCF standard, and a directory name, which does not conform to the DCF standard, in the recording medium so that the image data can be easily searched (refer to patent document 1, for example).

Moreover, there is a known viewer device which uses a hierarchical directory structure and a directory name which do not conform to DCF standard to enhance a visibility and can display image data included in a predetermined directory or image data included under the predetermined directory as a slide show (refer to patent document 2).

However, the technique described in the patent document 1 is to search a directory or an image data which conforms to the DCF standard, so that it cannot deal with a directory and an image data which does not conform to the DCF standard by reason of changing the directory name or the file name. Moreover, the technique described in the patent document 1 is to make a search for each directory or image data, so that when a plurality of image data are displayed as a slide show, for example, all of the image data in the directory need to be displayed. Thus, the slide show of each cluster desired by the user cannot be displayed, and moreover, an amount of time for displaying the slide show of each directory increases.

In the technique described in the patent document 2, the image data included in the directory structure which does not conform to the DCF standard can be displayed as the slide show, however, the image data cannot be displayed on other equipment such as a digital television, a digital camera, a mobile phone, a digital photo frame, or the like which conforms to the DCF standard.

PRIOR ART DOCUMENT(S)

Patent Document(s)

Patent Document 1: Japanese Laid-Open Patent Publication No. 2005-244614
Patent Document 2: International Publication WO 2007/055334

SUMMARY OF THE INVENTION

Problems to be Solved by the Invention

The present invention is to solve the above problems, and an object of the present invention is to provide an image data display system which can classify a plurality of image data as a cluster in accordance with a condition desired by a user, even when there is a directory or an image data which does not conform to DCF standard, and enables the user to manage the cluster in accordance with a cluster name, which is easily and visually recognized by the user, within the DCF standard to select a desired cluster easily, so that the plurality of the image data in each cluster desired by the user can be displayed as a slide show.

Means to Solve the Problem(s)

To achieve the above object, an image data display system according to one aspect of the present invention includes: an image data input unit to which image data and attribute information of the image data are inputted; an image display screen which displays the image data or the attribute information; an input unit to which character information or an operation command is inputted by a user; a control unit which controls the image data display system; and a memory unit which stores a control program to control the image data display system, wherein the control unit executes processings of: creating a cluster which includes a plurality of the image data based on a directory which stores the image data; designating a directory name of the directory as a first cluster name candidate; calculating a period when the image data included in the cluster is created as an image creation period based on a creation date and time of the image data and designating the image creation period as a second cluster name candidate; designating an arbitrary character string as a third cluster name candidate in response to a provision of the character string to the cluster via the input unit; and creating a slide show table which associatedly stores the first cluster name candidate, the second cluster name candidate, and the third cluster name candidate, the memory unit stores the slide show table, and the image display screen executes processings of: combinedly displaying any two of the first cluster name candidate, the second cluster name candidate, and the third cluster name candidate stored in the slide show table as a cluster name of the cluster, and displaying the image data included in the cluster to which the cluster name is provided as a slide show in response to a selection of the cluster via the input unit.

According to the above configuration, the image data display system creates the cluster including a plurality of image data, associatedly stores the cluster with the directory name, the image creation period, and the arbitrary character string inputted by the user. The image display screen combinedly displays any two of the directory name, the image creation period and the arbitrary character string when displaying the image data included in the cluster as the slide show. Accordingly, the user recognizes the cluster name, which is important information of the cluster including the image data, together with the image data displayed as the slide show, so that the user can select the desired cluster and displays it as the slide show.

In another aspect of the present invention, the attribute information is FAT (File Allocation Table) data or Exif (Exchangeable Image File Format) data of the image data, and the control unit executes processings of: creating the cluster including the plurality of the image data based on a common attribute information in the attribute information; designating a name which is determined based on the common attribute information as a first cluster name candidate; calculating the image creation period of the cluster and designating the image creation period as a second cluster name candidate; and designating an arbitrary character string as a third cluster name candidate in response to a provision of the character string to the cluster via the input unit.

According to the above configuration, the image data display system creates a logical cluster regardless of the directory structure by creating the cluster based on the FAT data or the Exif data which is associated with the image data. Moreover, the image data system designates the common attribute information as the first cluster name candidate, designates the image creation period as the second cluster name candidate, and designates the character string inputted by the user as the third cluster name candidate, and then combinedly displays any two of first cluster name candidate, the second cluster name candidate, and the third cluster name candidate as the cluster name.

In another aspect of the present invention, the first cluster name candidate is the directory name which conforms to DCF standard.

According to the above configuration, the image data display system designates the directory name, which is made up of three digit numbers and five alphabetical characters conforming to the DCF standard, as the first cluster name candidate. Accordingly, the image data display system can have the directory name which conforms to the DCF standard for each cluster.

In another aspect of the present invention, the control unit determines whether or not the directory name conforms to the DCF standard, and when the directory name does not conform to the DCF standard, the control unit designates the directory name as a third cluster name candidate and changes the directory name to a name which conforms to the DCF standard.

According to the above configuration, the image data display system changes the directory name which does not conform to the DCF standard to the directory name which conforms to the DCF standard while storing the directory name which does not conform to the DCF standard. Accordingly, the image display screen can display the directory name which does not conform to the DCF standard as the cluster name. Moreover, the user can regenerate the directory to which the directory name, which does not conform to the DCF standard, is provided on other equipment which conforms to the DCF standard.

In another aspect of the present invention, the image display screen displays the cluster name and the image data superimposedly or to be adjacent to each other.

According to the above configuration, the image display screen can display the image data and the cluster name in a position easily and visually recognized by the user in accordance with a size or a shape of the image display screen.

In another aspect of the present invention, the control unit obtains, by reference to the FAT data, a total number of the image data included in the cluster, obtains an earliest date in the creation dates of the image data as an earliest creation date and a latest date in the creation dates of the image data as a latest creation date, respectively, calculates an amount of time required for displaying the image data included in the cluster as the slide show, and, by reference to the Exif data, obtains a thumbnail image of the predetermined image data included in the cluster, and the image display screen displays the cluster name, the total number, the earliest creation date, the latest creation date, the amount of time, or the thumbnail image together with the image data when displaying the image data as the slide show.

According to the above configuration, the image data display system obtains the total number, the earliest creation date, the latest creation date, and the amount of time based on the FAT data. Accordingly, the image data display system can obtain the total number, the earliest creation date, the latest creation date, and the amount of time in a short time compared to a case of obtaining these data based on the Exif data. Moreover, the image display screen displays the cluster name, the total number, the earliest creation date, the latest creation date, the amount of time, or the thumbnail image together with the image data. Accordingly, the user can recognize the information of the cluster and the image data.

In another aspect of the present invention, the image display screen displays a character string input window to which a character string is inputted as the third cluster name candidate, and the control unit makes the slide show table store the inputted character string as the third cluster name candidate in response to an input of the character string to the character string input window via the input unit.

According to the above configuration, the image data display system designates the arbitrary character string inputted by the user as the third cluster name candidate. Accordingly, the user can provide the arbitrary character string as the cluster name.

In another aspect of the present invention, the image display screen combinedly displays the second cluster name candidate and the third cluster name candidate stored in the slide show table as the cluster name and displays a list of a plurality of the cluster names.

According to the above configuration, the image data display screen enables the user to visually recognize the image creation period and the character string while maintaining the high visibility by displaying the list of the plurality of the cluster names, so that the user can easily select the desired cluster.

In another aspect of the present invention, the image data display system further includes: a lens and an optical pickup element to take an image of an object; an operation panel to set a shooting mode instead of the image display screen and the input unit; and a shooting mode code output unit which outputs a shooting mode code, which corresponds to the shooting mode, to the control unit when the image of the object is taken, wherein the operation panel displays the image data or the attribute information, character information or an operation command is inputted to the operation panel by a user, the shooting mode code output unit stores a shooting mode table which associatedly stores the shooting mode with the shooting mode code, and the control unit creates the image data in response to a shooting of the image of the object, obtains the shooting mode code outputted by the shooting mode code output unit, creates a shooting mode data which associatedly stores a file name of the image data with the shooting mode code, and makes the memory unit store the shooting mode data.

According to the above configuration, the image data display system associatedly stores the image data created by taking the image of the object with the shooting mode. Accordingly, the image data display system can create the cluster based on the shooting mode and designate the name of the predetermined shooting mode as the first cluster name candidate or the third cluster name candidate. The image display screen displays the cluster in high visibility, so that the user can easily select the desired cluster and display the image data as the slide show.

In another aspect of the present invention, an image data display program for a computer to display the image data, the computer have: an image data input unit to which image data and attribute information of the image data are inputted; an image display screen which displays the image data or the attribute information; an input unit to which character information or an operation command is inputted by a user; a control unit which controls the computer; and a memory unit which stores a control program to control the computer, wherein the image data display program makes the control unit execute steps of: creating a cluster which includes a plurality of the image data based on a directory which stores the image data; designating a directory name of the directory as a first cluster name candidate; calculating a period when the image data included in the cluster is created as an image creation period based on a creation date and time of the image data and designating the image creation period as a second cluster name candidate; designating an arbitrary character string as a third cluster name candidate in response to a provision of the character string to the cluster via the input unit; creating a slide show table which associatedly stores the first cluster name candidate, the second cluster name candidate, and the third cluster name candidate; storing the slide show table in the memory unit; combinedly displaying, on the image display screen, any two of the first cluster name candidate, the second cluster name candidate, and the third cluster name candidate stored in the slide show table as a cluster name of the cluster; and displaying the image data included in the cluster to which the cluster name is provided as a slide show in response to a selection of the cluster via the input unit.

According to the above configuration, the user displays the image data as the slide show and recognizes the cluster name, which is the important information of the cluster including the image data, together with the image data using the computer, so that the user can select the desired cluster and displays it as the slide show.

In another aspect of the present invention, the attribute information is FAT data or Exif data of the image data, and the image data display program makes the control unit execute steps of: creating the cluster including the plurality of the image data based on a common attribute information in the attribute information; designating a name which is determined based on the common attribute information as a first cluster name candidate; calculating the image creation period of the cluster and designating the image creation period as a second cluster name candidate; and designating an arbitrary character string as a third cluster name candidate in response to a provision of the character string to the cluster via the input unit.

According to the above configuration, the user creates a logical cluster regardless of the directory structure in the desired condition using the computer. Moreover, the user designates the common attribute information as the first cluster name candidate, designates the image creation period as the second cluster name candidate, and designates the character string inputted by the user as the third cluster name candidate, and then combinedly displays any two of first cluster name candidate, the second cluster name candidate, and the third cluster name candidate as the cluster name using the computer.

In another aspect of the present invention, the image data display program makes the control unit execute a step of designating the directory name which conforms to DCF standard as the first cluster name candidate.

According to the above configuration, the user can associate the directory name which conforms to the DCF standard for each cluster using the computer.

In another aspect of the present invention, the image data display program makes the control unit execute steps of determining whether or not the directory name conforms to the DCF standard, and when the directory name does not conform to the DCF standard, designating the directory name as a third cluster name candidate and changing the directory name to a name which conforms to the DCF standard.

According to the above configuration, the user can display the directory name which does not conform to the DCF standard as the cluster name using the computer. Moreover, the user can regenerate the directory to which the directory name, which does not conform to the DCF standard, is provided on the other equipment which conforms to the DCF standard.

In another aspect of the present invention, the image data display program makes the image display screen execute a step of displaying the cluster name and the image data superimposedly or to be adjacent to each other.

According to the above configuration, the user can display the image data and the cluster name in a position easily and visually recognized by the user in accordance with a size or a shape of the image display screen using the computer.

In another aspect of the present invention, the image data display program makes the control unit execute steps of obtaining, by reference to the FAT data, a total number of the image data included in the cluster, obtaining an earliest date in the creation dates of the image data as an earliest creation date and a latest date in the creation dates of the image data as a latest creation date, respectively, calculating an amount of time required for displaying the image data included in the cluster as the slide show, and, by reference to the Exif data, obtaining a thumbnail image of the image data included in the cluster, and the image data display program makes the image display screen execute a step of displaying the cluster name, the total number, the earliest creation date, the latest creation date, the amount of time, or the thumbnail image together with the image data when displaying the image data as the slide show.

According to the above configuration, the user can record a name of place where the image data is taken as an album name in a user comment tag based on contents of an Exif file which is associated with the image data using the computer. Accordingly, the user can recognize the name of place where the image data is taken by visually recognizing the album name displayed on the image display screen.

In another aspect of the present invention, the image data display program makes the image display screen execute a step of displaying a character string input window to which a character string is inputted as the third cluster name candidate, and makes the control unit execute a step of making the slide show table store the inputted character string as the third cluster name candidate in response to an input of the character string to the character string input window via the input unit.

According to the above configuration, the user can watch the cluster name, the total number, the earliest creation date, the latest creation date, the amount of time, or the thumbnail image together with the image data in a short time after inputting the operation command using the computer.

In another aspect of the present invention, the image data display program makes the image display screen execute steps of combinedly displaying the second cluster name candidate and the third cluster name candidate stored in the slide show table as the cluster name and displaying a list of a plurality of the cluster names.

According to the above configuration, the user can visually recognize the image creation period and the character string while maintaining the high visibility by displaying the list of the plurality of the cluster names using the computer, so that the user can easily select the desired cluster.

In another aspect of the present invention, the computer further includes a lens and an optical pickup element to take an image of an object, an operation panel to set a shooting mode instead of the image display screen and the input unit, and a shooting mode code output unit which outputs a shooting mode code, which corresponds to the shooting mode, to the control unit when the image of the object is taken, wherein the operation panel displays the image data or the attribute information, character information or an operation command is inputted to the operation panel by a user, the shooting mode code output unit stores a shooting mode table which associatedly stores the shooting mode with the shooting mode code, and the image data display program makes the control unit execute steps of creating the image data in response to a shooting of the image of the object, obtaining the shooting mode code outputted by the shooting mode code output unit, creating a shooting mode data which associatedly stores a file name of the image data with the image mode code, and making the memory unit store the shooting mode data.

According to the above configuration, the user can provide the arbitrary character string as the cluster name using the computer.

BRIEF DESCRIPTION OF THE DRAWINGS

FIG. 8 is a configuration diagram of a slide show table according to the first preferred embodiment.

FIGS. 10A and 10B are diagrams showing a process of inputting a third cluster name candidate according to the first preferred embodiment.

FIG. 15 is a configuration diagram of a shooting mode table according to the second preferred embodiment.

FIG. 17 is a configuration diagram of a slide show table according to the second preferred embodiment.

Figure 1:
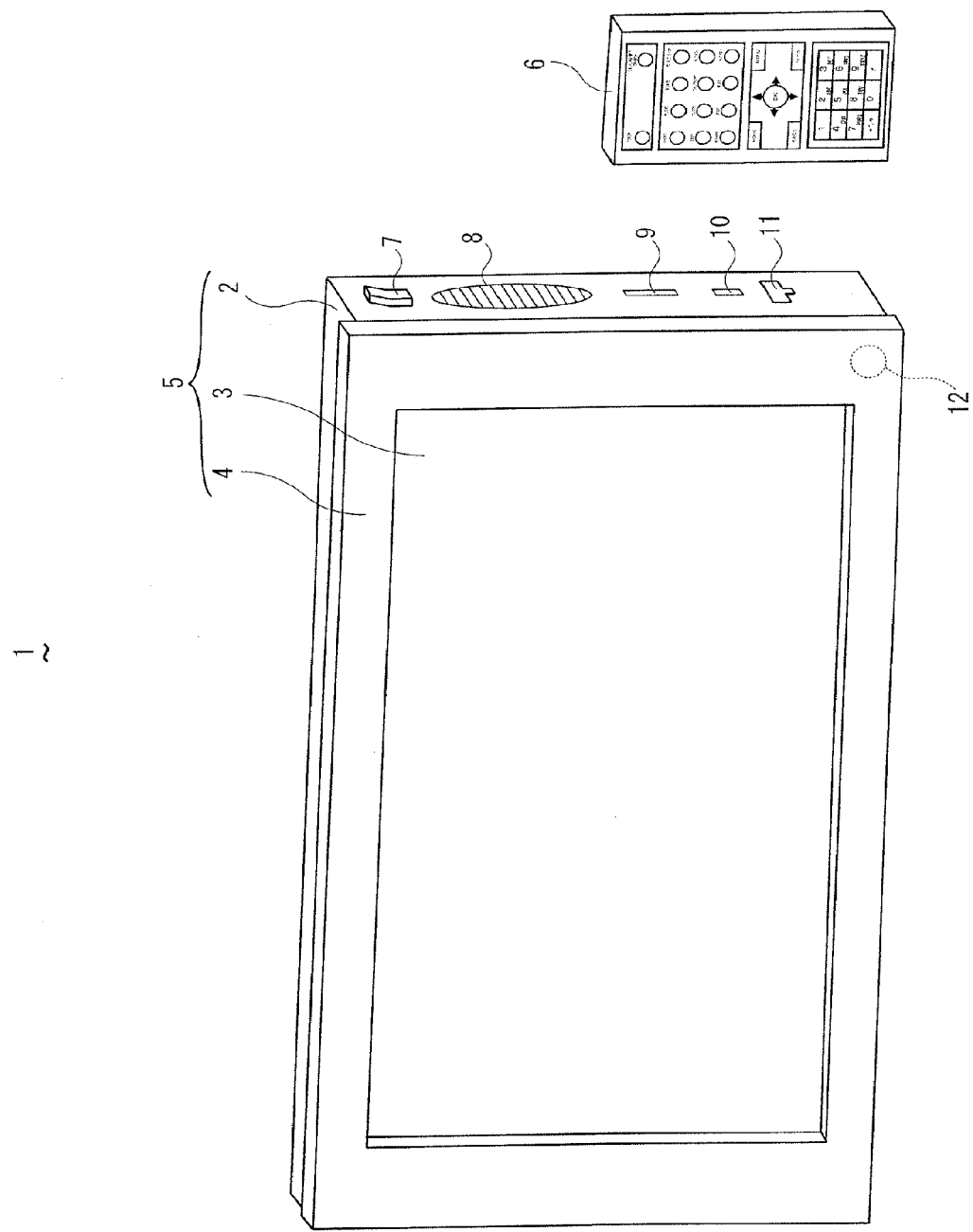
FIG. 1 is a perspective view of an outline of an image data display system according to a first preferred embodiment of the present invention.

DESCRIPTION OF THE NUMERALS 1 image data display system
3 image display screen
6 remote controller (input unit)
13 image data
13s thumbnail image
14 cluster name
17 CPU (control unit)
18 control program
19 memory unit
27 image data memory unit (memory unit)
29 FAT data (attribute information)
30 Exif data (attribute information)
31 slide show table
31b first cluster name candidate
31f earliest creation date
31h latest creation date
31j second cluster name candidate
31k third cluster name candidate
35b character string input window
36b total number
36d amount of time
38 memory card (memory unit)
42 operation panel
44 shooting mode code output unit
45 shooting mode table
46 shooting mode data

DESCRIPTION OF THE PREFERRED EMBODIMENTS

An image data display system according to a first preferred embodiment of the present invention is described with reference to the drawings. FIG. 1 shows an outline of the image data display system according to the preferred embodiment of the present invention. An image data display system 1 includes a main unit 5 provided with a frame unit 4, in which an image display screen 3 made up of a liquid crystal screen or an organic EL (electroluminescence) screen, which displays image data, is embedded, on a front surface of a housing 2 having a substantially rectangular parallelepiped shape and a remote controller 6 (input unit) which is used to input an operation command to the main unit 5. The main unit 5 has a power button 7 which controls a power supply to the main unit 5, a speaker 8 which outputs audio, a memory card slot 9, a USB (Universal Serial Bus) terminal 10, and a communication terminal 11 in a side surface of the housing 2. The main unit 5 further has a remote control signal receiving unit 12 inside the frame unit 4 to receive remote control signals from the remote controller 6. Each of the image display screen 3 and the frame unit 4 has a rectangular shape, and a ratio of width to height of the rectangular shape is 16 to 9, for example. A memory card such as a memory stick, a SD (Secure Digital) card, a compact flash, or the like is inserted into the memory card slot 9. A USB cable is connected to the USB terminal 10, and a LAN cable or a phone line is connected to the communication line terminal 11. The image data display system 1 exchanges data with an external equipment such as an external image memory, a digital camera, a personal computer, a mobile phone, or the like via the USB cable, the LAN cable, or the phone line.

Figure 2:
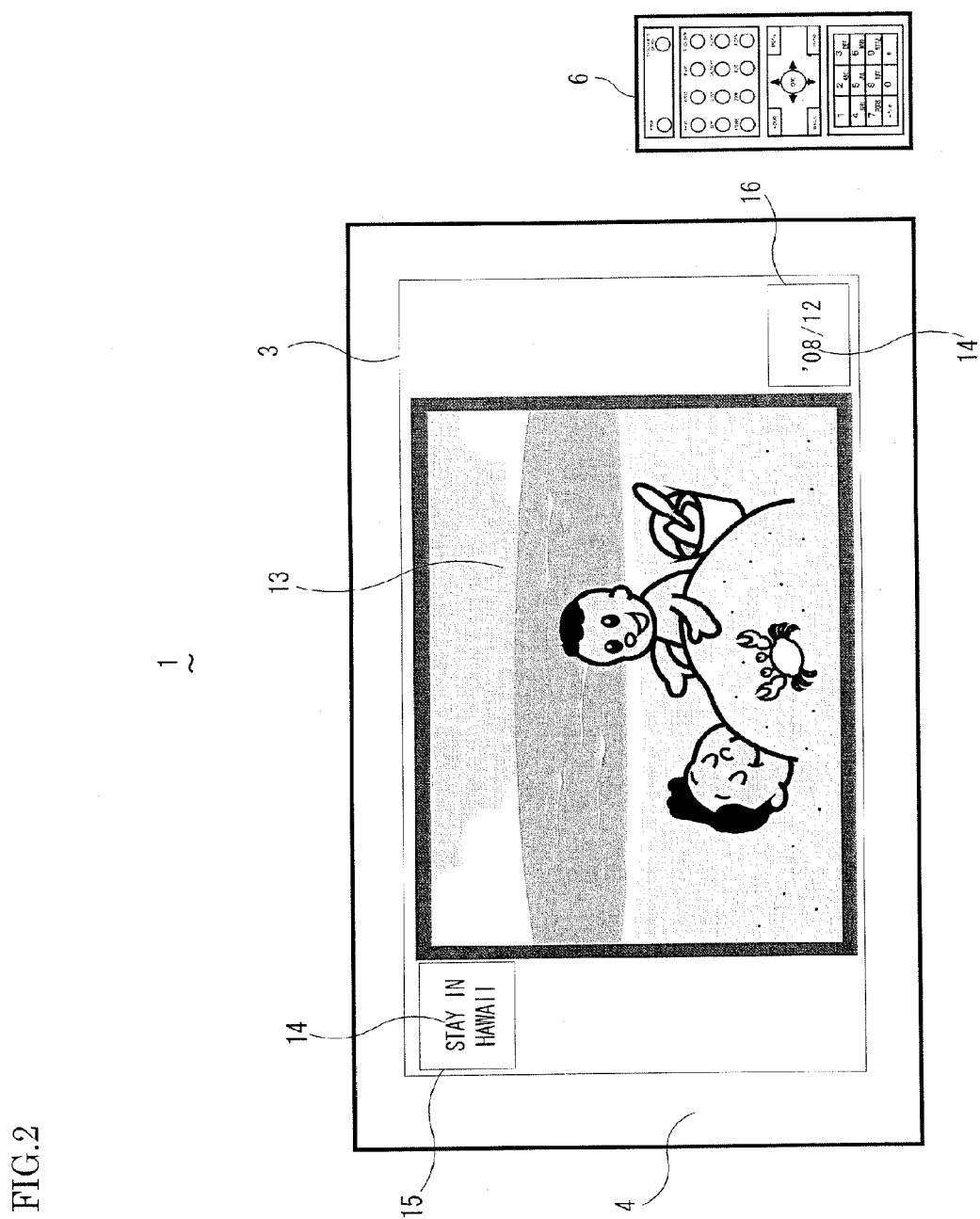
FIG. 2 is a diagram showing a display on an image display screen according to the first preferred embodiment.

FIG. 2 shows a display on the image display screen 3. The image display screen 3 displays an image data 13 which is classified into a predetermined cluster, a first cluster name display window 15 which displays a portion of a cluster name 14, which is a name of the cluster, and a second cluster name display window 16 which displays a portion of a cluster name 14 in the same manner as the first cluster name display window 15. The image data 13 is a digital image taken by a digital camera, for example. The first cluster name display window 15 is displayed adjacent to an upper left side of the image data 13, and the second cluster name display window 16 is displayed adjacent to a lower right side of the image data 13. The cluster 14 is a name provided to a cluster which includes a plurality of the image data 13, and all of the image data 13 to which the identical cluster name 14 is provided belong to the same cluster. In FIG. 2, the cluster name 14 of the cluster to which the image data 13 belongs is "'08/12 stay in Hawaii", for example, and the first cluster name display window 15 displays "stay in Hawaii" which is a portion of the cluster name 14, and second cluster name display window 16 displays "'08/12" which is also a portion of the cluster name 14. Accordingly, a user can recognize various information such as a shooting status, a shooting time, or the like of the image data 13 together with the image data 13. The cluster name 14 is displayed in Japanese, English, French, German, Korean, Chinese, or the like. In the present preferred embodiment, the image display screen 3 displays the cluster name 14 in English.

Figure 3:
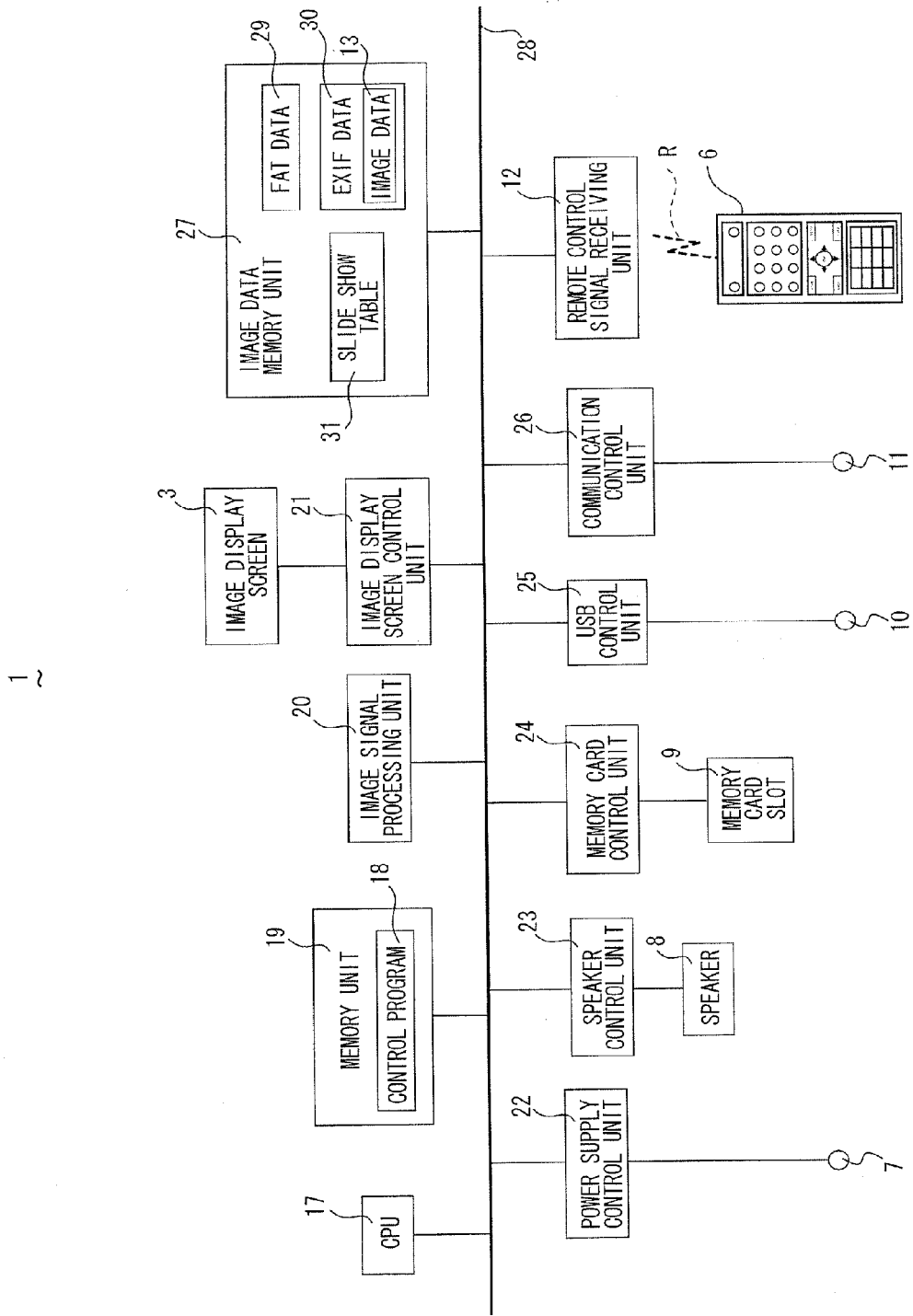
FIG. 3 is a configuration diagram of the image data display system according to the first preferred embodiment.

FIG. 3 shows a configuration of the image data display system 1. The image data display system 1 includes a CPU 17 (control unit) which controls the image data display system 1, a memory unit 19 which stores a control program 18 to control the image data display system 1, an image signal processing unit 20 which processes signals of the image data 13, an image display screen control unit 21 which controls the image display screen 3, a power supply control unit 22 which controls a power supply to the image data display system 1, a speaker control unit 23 which controls the speaker 8, a memory card control unit 24 which controls the memory card slot 9, a USB control unit 25 which controls the USB terminal 10, a communication control unit 26 which controls the communication line terminal 11, an image data memory unit 27 (memory unit) which stores the image data 13, and the remote control signal receiving unit 12 which receives a remote control signal R from the remote controller 6, and they are connected to a bus 28.

The image data memory unit 27 stores a FAT (File Allocation Table) data 29 and a Exif (Exchangeable Image File Format) data 30 which are associated with the image data 13 taken from the external equipment via the memory card slot 9, the USB terminal 10, or the communication line terminal 11.

The FAT data 29 is data which stores information regarding a memory location of the image data 13 or a creation date and time of the image data 13 in the image data memory unit 27. The Exif data 30 is information of the image data 13, which is taken by the digital camera, converted into a format to be able to be regenerated by various types of equipments, and the image data 13 is stored in the Exif data 30. Moreover, the image data memory unit 27 classifies the plurality of the image data 13 into a cluster based on the information stored in the FAT data 29 or the Exif data 30 and stores a slide show table 31 which is used to display the plurality of the image data 13 in the cluster as a slide show.

Figure 4:
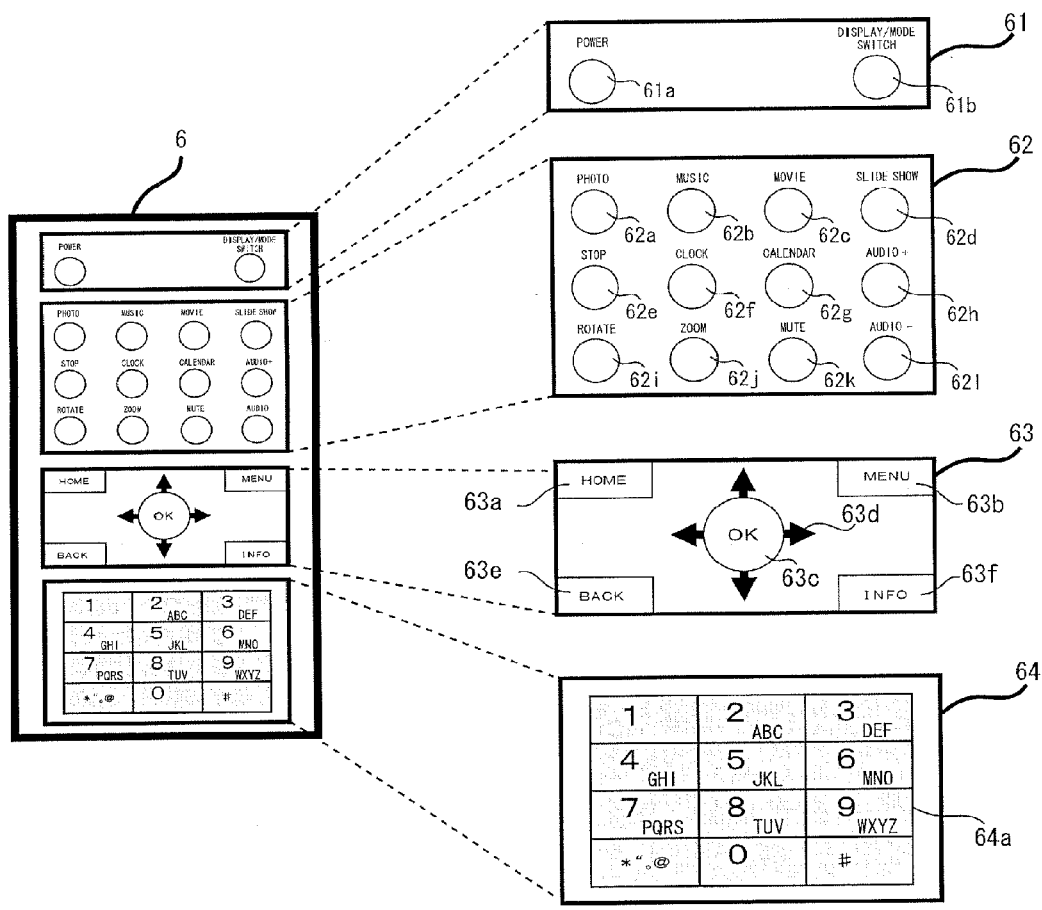
FIG. 4 is an outline view of a remote controller according to the first preferred embodiment.

FIG. 4 shows an outline of the remote controller 6. The remote controller 6 has a first operation key group 61 which is made up of two operation buttons, a second operation key group 62 which is made up of twelve operation buttons, a third operation key group 63 which is made up of an arrow key and a function key, and a fourth operation key group 64 which is made up of a numeric key. The first operation key group 61 is made up of keys to watch the image data 13, and the second operation key group 62 is made up of keys to use a function of the image data display system 1 with a simple operation. Moreover, the third operation key group 63 is made up of keys for the user to input an operation command based on information displayed on the image display screen 3, and the fourth operation key group 64 is made up of keys for the user to input a character string.

The first operation key group 61 has a power button 61a to control a power supply and a display mode switching button 61b to set whether or not to display the cluster name 14 on the image display screen 3. By operating the first operation key group 61, the user can select a simultaneous display of the image data 13 and the cluster name 14 or a single display of the image data 13 without displaying the cluster name 14 on the image display screen 3.

The second operation key group 62 has a photo button 62a to display the image data 13 on the image display screen 3, a music button 62b to output audio from the speaker 8, a movie button 62c to regenerate a movie stored in the memory card or the image data memory unit 27, a slide show button 62d to display the plurality of the image data 13 as the slide show, a stop button 62e to stop various operations, a clock button 62f to display a clock on the image display screen 3, a calendar button 62g to display a calendar on the image display screen 3, an audio+button 62h to increase a volume of the audio outputted from the speaker 8, a rotation button 62i to rotate the image data 13 displayed on the image display screen 3 90 degrees rightward with each press of the rotation button 62i, a zoom button 62j to enlarge a center of the image data 13 displayed on the image display screen 3, a mute button 62k not to output the audio from the speaker 8, and an audio—button 62l to decrease the volume of the audio outputted from the speaker 8. The user can make the image data display system 1 execute the various operations with the simple operation of the second operation key group 62.

The third operation key group 63 has a HOME button 63a to return a setting of the image data display system 1 to its original state, a MENU button 63b to display an operation menu on the image display screen 3, an OK button 63c to determine the operation command, an arrow key 63d to determine a direction, that is, up, down, right, and left, a BACK button 63e to return the operation executed on the image data display system 1 to the last operation state, an INFO button 63f to display an explanation or a clue for the operation on the image display screen 3. The user can select the image data 13 by operating the third operation key group 63. The fourth operation key group 64 has an ANK key 64a used for inputting a number, a code, and a letter. The user can change the cluster name 14 to a desired character string by operating the ANK key 64*a*. As described above, the remote controller 6 has the first operation key group 61 to the fourth operation key group 64 based on a difference in operation. Accordingly, the user can select a desired key from the various keys without confusion.

Figure 5:
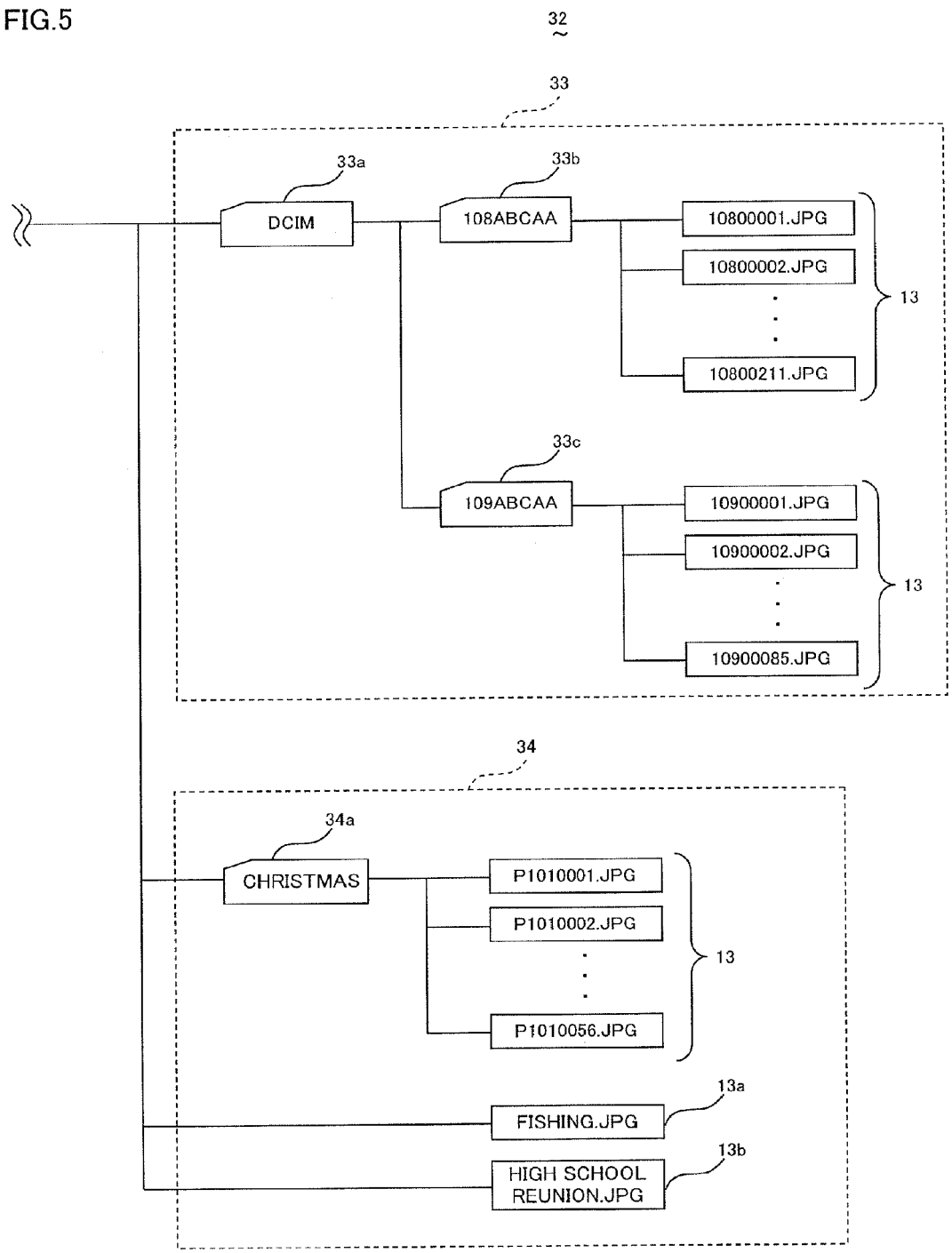
FIG. 5 is a diagram of a directory structure in an image data memory unit according to the first preferred embodiment.

FIG. 5 shows an example of a directory structure 32 in the image data memory unit 27. In the present preferred embodiment, the directory structure 32 is copied from the memory card to the image data memory unit 27 via the memory card slot 9. The directory structure 32 is made up of a directory group 33 which conforms to DCF (Design rule for Camera File system) standard and a directory group 34 which does not conform to the DCF standard. The directory group 33 is made up of a directory 33*a*, a directory 33*b*, and a directory 33*c*, whose directory names are "DCIM", "108ABCAA", and "109ABCAA", respectively. In contrast, the directory group 34 is made up of a directory 34*a* whose directory name is "Christmas" and an image data 13*a* and an image data 13*b* which are the image data 13 which are not included in the directory but are independently present and whose image data names are "fishing JPG" and "high school reunion JPG", respectively. In the present preferred embodiment, the directories 33*a* to 33*c* and the directory 34*a* have a function to manage the plurality of the image data 13 as a cluster.

The directories 33*a* to 33*c* included in the directory group 33 and the image data 13 included in the directories 33*a* to 33*c* conform to the DCF standard, so that they can be regenerated by the other equipment such as a digital television, a digital camera, a mobile phone, a digital photo frame, or the like which conforms to the DCF standard. However, the names of the directories 33*a* to 33*c* are displayed in only capital alphabetical characters and numeric characters, so that the user cannot easily recognize what kind of image data 13 is included in the directories 33*a* to 33*c* just by looking at the directory names of the directories 33*a* to 33*c*. In contrast, the directory 34*a* and the image data 13*a* and 13*b* included in the directory group 34 do not conform to the DCF standard, so that they cannot be regenerated by the other equipment which conforms to the DCF standard. However, the user can easily recognize contents of the image data 13 included in the directory 34*a* and the image data 13*a* and 13*b* just by looking at the directory name of the directory 34*a* and the image data names of the image data 13*a* and 13*b* to which arbitrary character strings are provided. The image data display system 1 displays the image data 13 which conforms to the DCF standard and the image data 13*a* and 13*b* which do not conform to the DCF standard in the predetermined cluster as the slide show by reference to the FAT data 29 or the Exif data 30.

Figure 6:
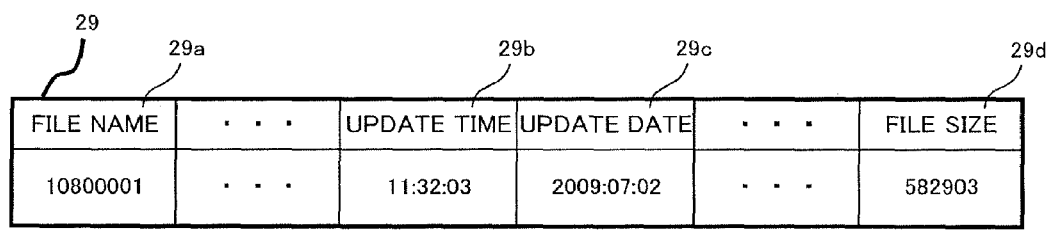
FIG. 6 is a configuration diagram of FAT data according to the first preferred embodiment.

Next, the FAT data 29 stored in the image data memory unit 27 is described. FIG. 6 shows an example of a configuration of the FAT data 29. The FAT data 29 stores a file name 29*a* which stores the image data name of each image data 13, an update time 29*b* which stores a time when the image data 13 is updated, an update date 29*c* which stores a date when the image data 13 is updated, and a file size 29*d* which stores a volume of the image data 13. The CPU 17 can obtain the image data name, the update date and time of the image data 13, and the file size of the image data 13 by reference to the FAT data 29. Moreover, the CPU 17 can obtain a total number of the image data 13 included in the directory 33*b*, for example, by reference to the FAT data 29. When the image data 13 is created, the update time 29*b* and the update date 29*c* store the time and date at the time of creation of the image data 13. When a modification such as a trimming, a color correction, or the like is added to the image data 13 afterwards, the update time 29*b* and the update date 29*c* store the time and date at the time of modification.

Figure 7:
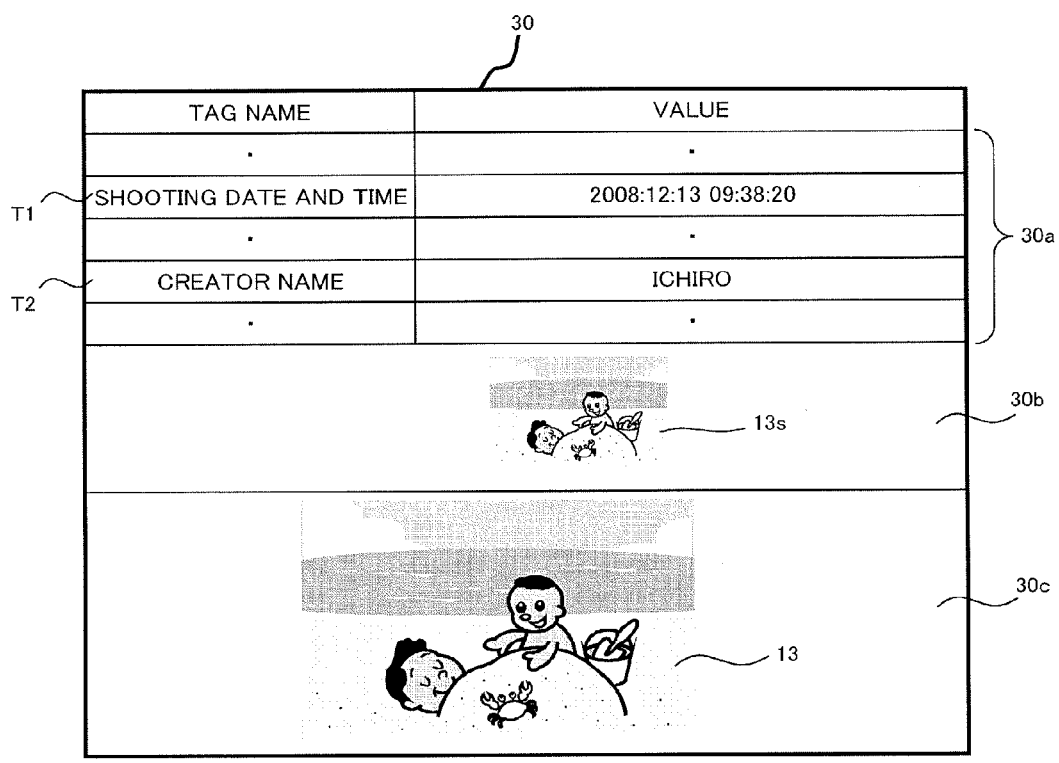
FIG. 7 is a configuration diagram of Exif data according to the first preferred embodiment.

Next, the Exif data 30 stored in the image data memory unit 27 is described. FIG. 7 shows an example of a configuration of the Exif data 30. The Exif data 30 is made up of a header area 30*a* which stores data of the image data 13, a thumbnail area 30*b* which stores a thumbnail image data 13*s* of the image data 13, and an image data area 30*c* which stores the image data 13. The data stored by the header area 30*a* is a total number of pixels or a compression mode of the image data 13, a model name or an aperture value of a digital camera, or the like, for example. Only data accessed by the CPU 17 in the present preferred embodiment is shown in FIG. 7. The header area 30*a* stores a shooting date and time tag T1 which stores a date and time when the image data 13 is taken and a creator name tag T2 which stores a name of a person who takes the image data 13.

The shooting date and time tag Ti stores a shooting date and time, which is separated by colon, of the image data 13. For example, "2008: 12:13 09:38:20" in the shooting date and time tag T1 indicates that the image data 13 is taken at 09:38:20 a.m. on Dec. 13, 2008. The creator name tag T2 stores the name of the person who takes the image data 13 in alphabetical characters. For example, "ICHIRO" in the creator name tag T2 indicates that the image data 13 is taken by ICHIRO. In the present preferred embodiment, the value of the shooting date and time tag T1 is not changed even when the modification such as the trimming, the color correction, or the like is added to the image data 13 afterwards. Thus, the CPU 17 confirms whether or not the value of the shooting date and time tag T1 and the values of the update time 29*b* and the update date 29*c* in the FAT data 29 correspond with each other when an operation rate of the CPU 17 is low. When the value of the shooting date and time tag T1 and the values of the update time 29*b* and the update date 29*c* do not correspond with each other, the CPU 17 makes the update time 29*b* and the update date 29*c* store the value of the shooting date and time tag T1. Accordingly, the update time 29*b* and the update date 29*c* can store the shooting date and time of the image data 13 even when the modification is added to the image data 13.

Next, the slide show table 31 stored in the image data memory unit 27 is described. FIG. 8 shows an example of a configuration of the slide show table 31. The slide show table 31, which is a table to manage the plurality of the image data 13 as the cluster, is created based on the FAT data 29 and the Exif data 30. In the preferred embodiment, the cluster indicates not only the directory such as the directory 33*a* or the directory 34*a* but also the collection of the image data 13 which have a common update date 29*c* or creator name tag T2 in the image data 13 which are included in the plurality of the directories.

The slide show table 31 stores a cluster number 31*a*, a first cluster name candidate 31*b* which is a candidate displayed on the image display screen 3 as the cluster name 14, a cluster type 31*c*, a DCF conform/nonconform 31*d* which indicates whether or not the cluster conforms to the DCF standard, a total number of image data 31*e* which indicates a total number of the image data 13 included in the cluster, an earliest creation date 31*f* which indicates a creation date of the image data 13 which is created the earliest in the image data 13 included in the cluster, an earliest creation time 31*g* which indicates a creation time of the image data 13 which is created the earliest in the image data 13 included in the cluster, a latest creation date 31*h* which indicates a creation date of the image data 13 which is created the latest in the image data 13 included in the cluster, a latest creation time 31*i* which indicates a creation time of the image data 13 which is created the latest in the image data 13 included in the cluster, and a second cluster name candidate 31*j* and a third cluster name candidate 31*k* which are candidates displayed on the image display screen 3 as the cluster name 14. The cluster name 14 is created by combining any two of the first cluster name candidate 31*b*, the second cluster name candidate 31*j*, and the third cluster name candidate 31*k*. In the present preferred embodiment, the slide show table 31 provides the cluster number 31*a* to the cluster in order of the total number of image data 13*e*.

The cluster number 31*a* is the number provided to each cluster into which the plurality of the image data 13 are classified. In the preferred embodiment, the cluster to which "2" is provided as the cluster number 31*a* is referred to as a second cluster, and the second cluster is described hereinafter. The CPU 17 refers to the image data memory unit 27, designates the directory 33*b* as the second cluster 2, and records "2" as the cluster number 31*a*. Subsequently, the CPU 17 records the directory name "108ABCAA" of the directory 33*b* in the first cluster name candidate 31*b*. Since the CPU 17 creates the second cluster based on the directory 33*b*, the CPU 17 records "directory" in the cluster type 31*c* to indicate that the cluster is created based on the directory. The user can recognize whether or not the second cluster is created based on the directory by reference to the cluster type 31*c*.

Since the directory 33*b* is the directory which conforms to the DCIM (Digital Camera IMages) standard, the CPU 17 records "conform" in the DCF conform/nonconform 31*d*. The user can recognize whether or not the second cluster conforms to the DCF standard by reference to the DCF conform/nonconform 31*d*. The CPU 17 refers to the FAT data 29, obtains data that the total number of the image data 13 included in the directory 33*b* is 211, and records "211" in the total number of image data 31*e*. The user can recognize the total number of the image data 13 included in the second cluster by reference to the total number of image data 31*e*.

Subsequently, the CPU 17 identifies the image data 13 which is created the earliest and the image data 13 which is created the latest in the image data 13 included in the directory 33*b* by reference to the FAT data 29. The CPU 17 obtains the update time 29*b* and the update date 29*c* from the FAT data 29 of the image data 13 which is created the earliest. The CPU 17 records the update date 29*c* and the update time 29*b* in the earliest creation date 31*f* and the earliest creation time 31*g*, respectively. In the same manner, the CPU 17 obtains the update time 29*b* and the update date 29*c* from the FAT data 29 of the image data 13 which is created the latest. The CPU 17 records the update date 29*c* and the update time 29*b* in the latest creation date 31*h* and the latest creation time 31*i*, respectively. Accordingly, the earliest creation date 31*f*, the earliest creation time 31*g*, the latest creation date 31*h*, and the latest creation time 31*i* of the second cluster indicate that the second cluster includes the image data 13 which are created between "09:38:20 a.m. on Dec. 13, 2008" and "11:11:04 p.m. on Dec. 31, 2008". At this time, the CPU 17 records the data obtained not from the Exif data 30 but the FAT data 29 in the earliest creation date 31*f*, the earliest creation time 31*g*, the latest creation date 31*h*, and the latest creation time 31*i*. It is because the CPU 17 can obtain the data from the FAT data 29 in a shorter time compared to obtaining the data from the Exif data 30.

The CPU 17 calculates an image creation period from the earliest creation date 31*f*, the earliest creation time 31*g*, the latest creation date 31*h*, and the latest creation time 31*i* and records the calculated image creation period in the second cluster name candidate 31*j*. In the present preferred embodiment, the second cluster name candidate 31*j* of the second cluster is "'08/12", for example. "'08/12", which is the image creation period, indicates that all of the image data 13 included in the second cluster were created in December 2008. In response to an input of the character string to the second cluster via the remote controller 6, the CPU 17 records the inputted character string in the third cluster name candidate 31*k*. In the present preferred embodiment, "stay in Hawaii" is recorded in the third cluster name candidate 31*k*. The user can arbitrarily provide the name corresponding to the contents of the image data 13 to the predetermined cluster using the remote controller 6. When the third cluster name candidate 31*k* stores the character string, the CPU 17 designates the second cluster name candidate 31*j* and the third cluster name candidate 31*k* as the cluster name 14 and, as shown in FIG. 2, makes the first cluster name display window 15 display the third cluster name candidate 31*k* and makes the second cluster name display window 16 display the second cluster name candidate 31*j*. Accordingly, when the image data 13 are displayed as the slide show, the user can recognize the name which the user provides and the image creation period of the image data 13 included in the second cluster. In particular, the user can recognize a shooting status of the image data 13 by reference to the third cluster name candidate 31*k* displayed on the first cluster name display window 15.

With reference to FIG. 8, a third cluster to which "3" is provided as the cluster number 31*a* does not record the character string in the third cluster name candidate 31*k*. At this time, the CPU 17 designates the first cluster name candidate 31*b* and the second cluster name candidate 31*j* as the cluster name 14. The image display screen 3 makes the first cluster name display window 15 display the first cluster name candidate 31*b* and makes the second cluster name display window 16 display the second cluster name candidate 31*j*, for example. Accordingly, when the image data 13 are displayed as the slide show, the user can recognize the directory name and the image creation period of the image data 13 included in the third cluster.

Next, a fourth cluster to which "4" is provided as the cluster number 31*a* is described. The fourth cluster is the cluster which is created based on the directory 34*a* which does not conform to the DCF standard. Since the CPU 17 creates the fourth cluster based on the directory 34*b*, the CPU 17 records "directory" in the cluster type 31*c* and records "nonconform" in the DCF conform/nonconform 31*d*. In the present preferred embodiment, the directory name of the directory 34*a* is "Christmas". Since this directory name does not conform to the DCF standard, it is obvious that this directory name is provided by the user. At this time, the CPU 17 records the directory name "Christmas" not in the first cluster name candidate 31*b* but in the third cluster name candidate 31*k*. Accordingly, the CPU 17 can record the character string in the third cluster name candidate 31*k* without waiting for the user inputting the character string as the third cluster name candidate 31*k*.

Since the directory 34*a* does not conform to the DCF standard, the image data 13 included in the directory 34*a* cannot be regenerated by the other equipment which conforms to the DCF standard. Thus, the CPU 17 changes the directory name of the directory 34*a* stored in the image data memory unit 27 to a directory name "110XYZAA", for example, which conforms to the DCF standard so that the directory 34*a* conforms to the DCF standard. Accordingly, the image data 13 included in the directory 34*a* can be regenerated by the other equipment which conforms to the DCF standard. Moreover, the CPU 17 records the changed directory name of the directory 34*a* in the slide show table 31 as the first cluster name candidate 31*b*. Accordingly, the image data display system 1 can display even the image data 13 included in the directory 34a which did not conform to the DCF standard as the slide show and also can display the character string provided by the user on the image display screen 3 as the cluster name 14. The total number of image data 31e, the earliest creation date 31f, the earliest creation time 31g, the latest creation date 31h, and the latest creation time 31i of the fourth cluster are recorded by the same process as the second cluster.

Next, a fifth cluster to which "5" is provided as the cluster number 31a is described. The fifth cluster is created based on the update date 29c of the FAT data 29. In the present preferred embodiment, the CPU 17 refers to the update date 29c and extracts the image data 13 whose update date 29c falls under "2009:01:20" from all of the image data 13 stored in the image data memory unit 27. At this time, the image data 13 is extracted regardless of the directory structures of the directories 33a to 33c and the directory 34a in the image data memory unit 27. The CPU 17 designates the cluster including the extracted image data 13 as the fifth cluster. In the present preferred embodiment, "2009:01:20" is a birthday which is set by the user, and the user sets in advance to classify the image data 13 whose update date 29c is "2009:01:20" into the predetermined cluster. As described above, the image data display system 1 can create a logical cluster including the image data 13, which are included in the plurality of the directories, in accordance with a condition set by the user. Since the CPU 17 creates the fifth cluster based on the FAT data 29, the CPU 17 records "FAT data" in the cluster type 31c. Moreover, the fifth cluster is the logical cluster which is not based on the DCF standard, so that the CPU 17 records "nonconform" in the DCF conform/nonconform 31d.

The CPU 17 records the set of alpha-numeral characters "200BIRTH", which is the directory name which conforms to the DCF standard and which indicates that the fifth cluster is created based on the birthday, in the first cluster name candidate 31b. At this time, the CPU 17 records "birthday" not in the first cluster name candidate 31b but in the third cluster name candidate 31k. Accordingly, the CPU 17 can record the character string in the third cluster name candidate 31k even when the character string is not inputted by the user as the third cluster name candidate 31k. The image display screen 3 makes the first cluster name display window 15 display "birthday", which is the third cluster name candidate 31k, and makes the second cluster name display window 16 display "'09/1/20", which is the second cluster name candidate 31j. Accordingly, the user can create the cluster based on a condition which is set in advance regardless of the directory structure stored in the image data memory unit 27 and thus the slide show of the created cluster can be displayed.

Next, a sixth cluster to which "6" is provided as the cluster number 31a is described. In FIG. 5, the sixth cluster includes the image data 13a and 13b which are not included in the directory but are independently present. The CPU 17 refers to the Exif data 30 to create the cluster including the image data 13a and 13b. In the present preferred embodiment, the creator name tags T2 of the Exif data 30 in the image data 13a and 13b store "ICHIRO" which is set in advance by the user. The CPU 17 refers to the creator name tags T2 of all of the image data 13 stored in the image data memory unit 27, which includes the image data 13a and 13b, and extracts the image data 13 whose name of the person, who takes the image data 13, falls under "ICHIRO". The CPU 17 designates the cluster including the extracted image data 13 as the sixth cluster. Since the CPU 17 creates the sixth cluster based on the Exif data 30, the CPU 17 records "Exif data" in the cluster type 31c. The sixth cluster is the logical cluster which is not based on the DCF standard, so that the CPU 17 records "nonconform" in the DCF conform/nonconform 31d.

The CPU 17 records the set of alpha-numeral characters "300ICHIR", which is the directory name which conforms to the DCF standard and which indicates that the sixth cluster is created based on the creator name tag T2, which is associated with the character string which is set in advance by the user, in the first cluster name candidate 31b. At this time, the CPU 17 records "taken by ICHIRO" not in the first cluster name candidate 31b but in the third cluster name candidate 31k. Accordingly, the CPU 17 can record the character string in the third cluster name candidate 31k even when the character string is not inputted by the user as the third cluster name candidate 31k. The image display screen 3 makes the first cluster name display window 15 display "taken by ICHIRO", which is the third cluster name candidate 31k, and makes the second cluster name display window 16 display "'09/1/05-09", which is the second cluster name candidate 31j. Accordingly, the user can create the cluster of the image data 13a and 13b which are not included in the directory but are independently present.

Figure 9:
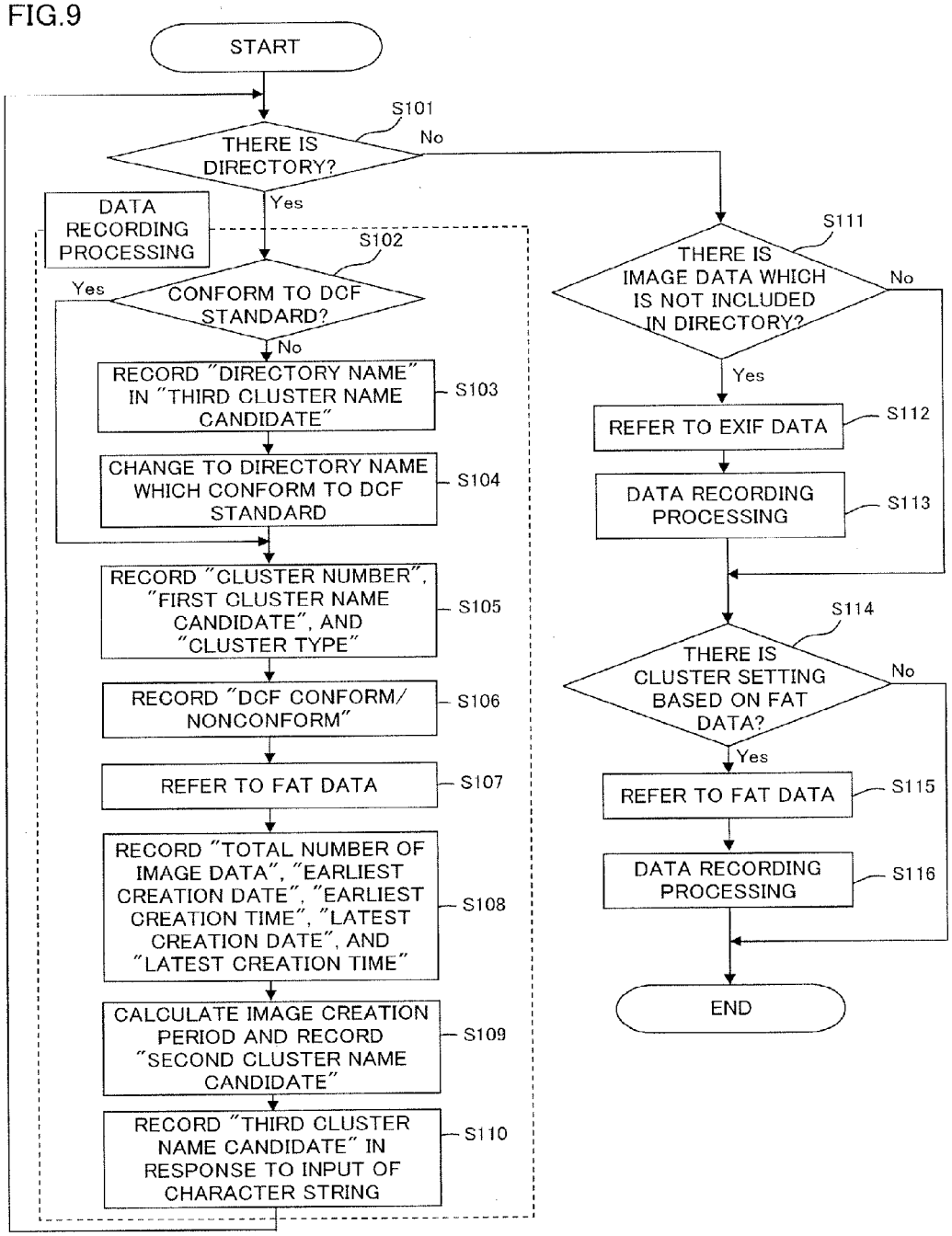
FIG. 9 is a flow chart of a recording processing to record data in the slide show table according to the first preferred embodiment.

Next, a process of recording data in the slide show table 31 executed by the CPU 17 is described. FIG. 9 shows a flow chart of a recording processing to record the data in the slide show table 31. The CPU 17 determines whether or not there is the directory in the image data memory unit 27 (S101). When there is no directory in the step S101 (No in S101), the CPU 17 executes a process of a step S111. In contrast, when there is the directory in the step S101 (Yes in S101), the CPU 17 determines whether or not the target directory conforms to the DCF standard (S102). When the directory does not conform to the DCF standard in the step S102 (No in S102), the CPU 17 records the directory name of the target directory in the third cluster name candidate 31k (S103). Subsequently, the CPU 17 changes the directory name to the directory name which conforms to the DCF standard (S104). The CPU 17 records the changed directory name which conforms to the DCF standard in the first cluster name candidate 31b (S105). At this time, the CPU 17 also records the data in the cluster number and the cluster type.

When the directory conforms to the DCF standard in the step S102 (Yes in S102), the CPU 17 records the directory name of the target directory in the first cluster name candidate 31b (S105). At this time, the CPU 17 also records the data in the cluster number and the cluster type. Subsequently, the CPU 17 records the contents determined in the step S102 in the DCF conform/nonconform 31d (S106). The CPU 17 refers to the FAT data 29 of the image data 13 included in the directory (S107) and records the data in the total number of image data 31e, the earliest creation date 31f, the earliest creation time 31g, the latest creation date 31h, and the latest creation time 31i, respectively (S108). The CPU 17 calculates the image creation period of the image data 13 included in the cluster from the earliest creation date 31f, the earliest creation time 31g, the latest creation date 31h, and the latest creation time 31i and records the calculated image creation period in the second cluster name candidate 31j (S109). In response to the input of the character string to the cluster as the name, the CPU 17 records the inputted character string in the third cluster name candidate 31k (S110). In the present preferred embodiment, the processing from the step S102 to the step S110 is referred to as the data recording processing.

Returning to the step S101, the CPU 17 determines whether or not there is the directory on which the data recording processing is not executed (S101) and executes the data recording processing on all of the directories. When the data recording processing is executed on all of the directories in the step S101 (No in S101), the CPU 17 determines whether or not there is the image data 13 which is not included in the directory in the image data memory unit 27 (S111). In the present preferred embodiment, the image data 13 which is not included in the directory is, for example, the image data 13a and 13b in FIG. 5. When there is no image data 13 which is not included in the directory in the step S111 (No in S111), the CPU 17 executes the processing of the step S114. In contrast, when there is the image data 13 which is not included in the directory in the step S111 (Yes in S111), the CPU 17 refers to the Exif data 30 of the image data 13 which is not included in the directory (S112). The CPU 17 creates the cluster which includes the image data 13 which is not included in the directory based on the referred Exif data 30 and executes the data recording processing on the created cluster (S113).

Subsequently, the CPU 17 determines whether or not there is, in advance, a setting to create the cluster based on the FAT data 29 (S114). In the present preferred embodiment, the setting to create the cluster based on the FAT data 29 is a setting to create the cluster based on the update date 29c of the FAT data 29, for example. When there is no setting to create the cluster based on the FAT data 29 in the step S114 (No in S114), the CPU 17 completes the recording processing to record the data in the slide show table 31. When there is the setting to create the cluster based on the FAT data 29 (Yes in S114), the CPU 17 refers to the FAT data 29 (S115). The CPU 17 creates the cluster based on the condition which is set in advance in the FAT data 29, executes the data recording processing on the created cluster (S116), and completes the recording processing to record the data in the slide show table 31.

Next, a process of inputting the third cluster name candidate 31k performed by the user is described. FIGS. 10A and 10B show the process of inputting the third cluster name candidate 31k. FIG. 10A shows a cluster name change screen 35 before the character string is inputted as the third cluster name candidate 31k, and FIG. 10B shows the cluster name change screen 35 after the character string is inputted as the third cluster name candidate 31k. In FIGS. 10A and 10B, the image display screen 3 displays the cluster name change screen 35 which is used to input the character string as the third cluster name candidate 31k. The cluster name change screen 35 displays a cluster name display window 35a which displays the cluster name 14 for each cluster and a character string input window 35b to which the user inputs the character string. When the character string is recorded in the third cluster name candidate 31k in the slide show table 31, the character string input window 35b displays the character string recorded in the third cluster name candidate 31k. For example, the cluster name display window 35a in a fourth line displays "'06-07 Christmas" as the cluster name 14 which is a combination of "Christmas", which is the third cluster name candidate 31k of the fourth cluster, and "'06-07", which is the second cluster name candidate 31j, in the slide show table 31. The character string name input window 35b in a fourth line displays "Christmas" which is the third cluster name candidate 31k of the fourth cluster.

In FIG. 10A, the character string name input window 35b in a third line, which is shown as a blank, does not display the character string. It is because the character string is not recorded in the third cluster name candidate 31k of the third cluster in the slide show table 31. The user can recognize that the character string is not recorded in the third cluster name candidate 31k of the third cluster by visually recognizing the blank of the character string name input window 35b in the third line. At this time, the character string name input window 35b in the third line displays "'09/1-2 109ABCAA" as the cluster name 14 which is a combination of "109ABCAA", which is the first cluster name candidate 31b of the third cluster, and "'09/1-2", which is the second cluster name candidate 31j, in the slide show table 31. The directory name "109ABCAA" as the cluster name 14 is displayed in the alpha-numeral characters, so that the user cannot easily confirm the contents of the image data 13 included in the cluster. Thus, the user can change "109ABCAA" displayed as the cluster name 14 by inputting the character string which corresponds to the contents of the image data 13 to the character string input window 35b.

In FIG. 10B, the user selects the character string input window 35b to which the character string is inputted using the remote controller 6. The cluster name change screen 35 displays the selected character string input window 35b in a thick-frame pattern. Accordingly, the user can confirm the selected character string input window 35b. Subsequently, the user inputs the character string using the fourth operation key group 64 of the remote controller 6 and subsequently presses an OK button 63c of the remote controller 6. In the present preferred embodiment, a character string "Hokkaido" is inputted to the character string input window 35b. In response to the press of the OK button 63c, the CPU 17 records the inputted character string "Hokkaido" in the third cluster name candidate 31k of the third cluster in the slide show table 31. After the character string is recorded in the third cluster name candidate 31k, the image display screen 3 displays the cluster name 14 of the third cluster not as "'09/1-2 109ABCAA" but as "'09/1-2 Hokkaido". As described above, the user can easily change the cluster name 14 by inputting the character string corresponding to the contents of the image data 13 in the cluster name change screen 35.

Figure 11:
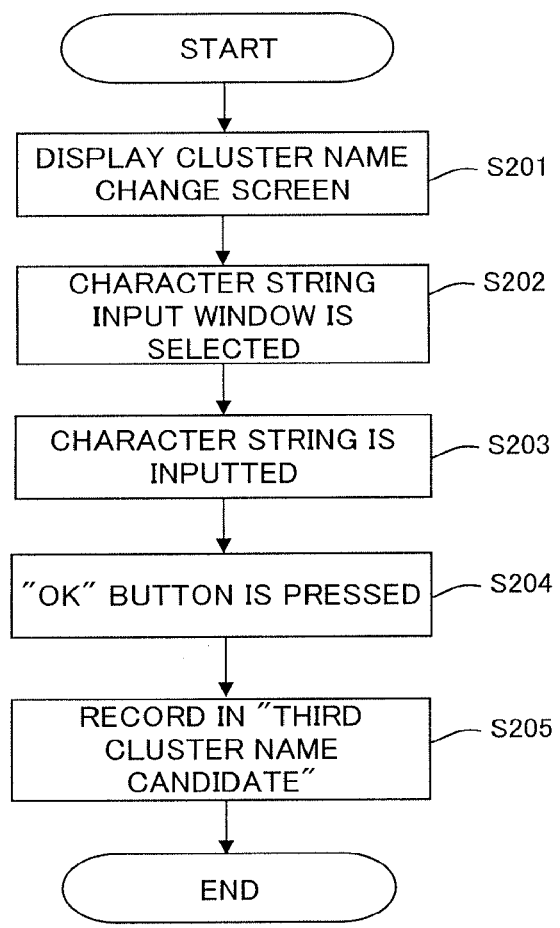
FIG. 11 is a flow chart of a cluster name change processing in a cluster name change screen according to the first preferred embodiment.

Next, a cluster name change processing to change the cluster name 14 performed by the user is described. FIG. 11 shows a flow chart of the cluster name change processing in the cluster name change screen 35. The CPU 17 makes the image display screen 3 display the cluster name change screen 35 in response to the input of the operation command via the remote controller 6 (S201). When the character string input window 35b is selected via the remote controller 6 (S202), the CPU 17 makes the cluster name change screen 35 display the selected character string input window 35b in the thick-frame pattern. When the character string is inputted via the remote controller 6, the CPU 17 makes the character string input window 35b display the inputted character string (S203). When the OK button 63c of the remote controller 6 is pressed after the character string is inputted to the character string input window 35b (S204), the CPU 17 records the inputted character string in the third cluster name candidate 31k in the slide show table 31 (S205) and completes the cluster name change processing. When the character string is already recorded in the third cluster name candidate 31k in the step S205, the CPU 17 records the newly-inputted character string in the third cluster name candidate 31k instead of the already-inputted character string.

Figures 12A, 12B:
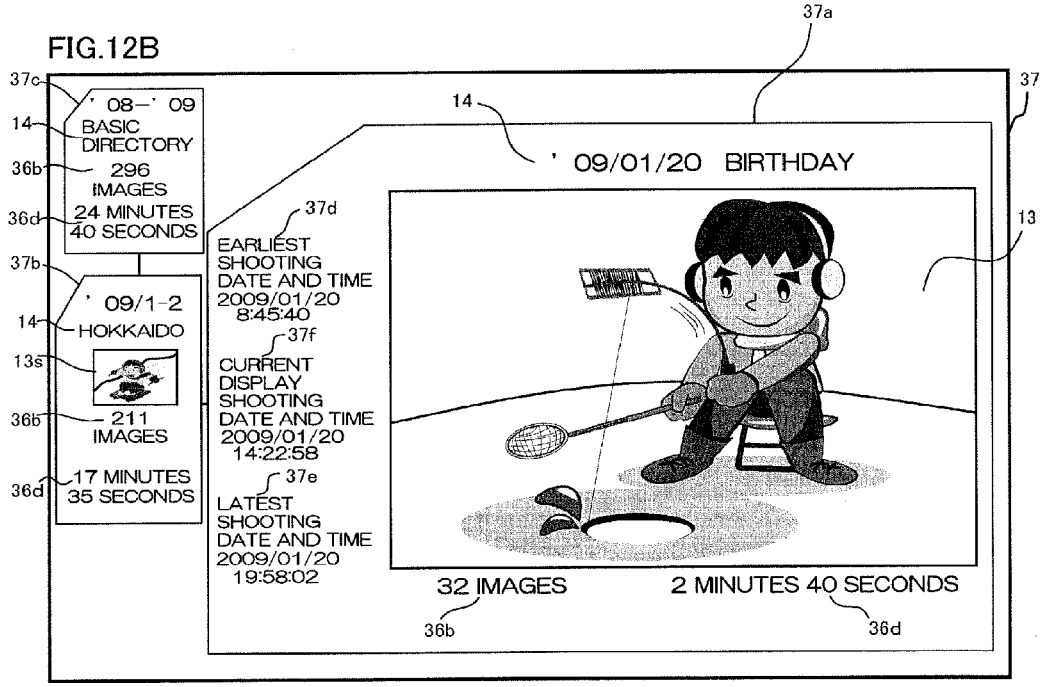
FIGS. 12A and 12B are diagrams showing a process of displaying image data as a slide show according to the first preferred embodiment.

Next, a process of displaying the image data 13 included in the selected cluster as the slide show is described. FIGS. 12A and 12B show a process of displaying the image data 13 as the slide show. FIG. 12A shows a cluster selection screen 36 in which the user selects the cluster, and FIG. 12B shows a slide show display screen 37 which displays the image data 13 included in the selected cluster as the slide show. In FIG. 12A, the cluster selection screen 36, which is displayed on the image display screen 3, displays a cluster name display window 36a which displays the cluster name 14 of each cluster, a total number display window 36c which displays a total number 36b of the image data 13 included in each cluster, and an amount of time display window 36e which displays an amount of time 36d required for displaying all of the image data 13 included in each cluster as the slide show. The cluster selection screen 36 displays a list of the cluster names 14 by displaying the plurality of the cluster name display windows 36a.

The CPU 17 refers to the FAT data 29, obtains the total number 36b of the image data 13 included in each cluster, and makes the total number display window 36c display the total number 36b. In the present preferred embodiment, the image display screen 3 displays the image data 13 for five seconds per one image data 13 when displaying the slide show. Accordingly, the CPU 17 makes the amount of time display window 36e display an amount of time calculated by multiplying the total number 36b by five seconds as the amount of time 36d. The user can easily recognize the contents of the image data 13 included in the cluster by confirming the cluster name 14 displayed on the cluster name display window 36a. Moreover, the user can recognize the total number 36b of the image data 13 included in the cluster by confirming the total number 36b displayed on the total number display window 36c. Furthermore, the user can recognize the amount of time 36d required for display the slide show by confirming the amount of time 36d displayed on the amount of time display window 36e.

Next, a method of selecting the cluster desired by the user rapidly and simply and displaying the image data included in the cluster as the slide show is described. The user selects the cluster to display as the slide show by reference to the list of cluster names 14, the total numbers 36b, and the amount of times 36d displayed on the cluster selection screen 36. The user selects the desired cluster using the remote controller 6. In the present preferred embodiment, the cluster whose cluster name 14 in the fifth line is "'09/01/20 birthday", the total number 36b is "32", and the amount of time 36d is "2 minutes 40 seconds" is selected. The cluster selection screen 36 displays the selected cluster name display window 36a, the total number display window 36c, and the amount of time display window 36e in the thick-frame pattern. Accordingly, the user can confirm the selected cluster. After selecting the desired cluster, the user presses the slide show button 62d in the second operation key group 62 in the remote controller 6 so that the image data 13 included in the selected cluster are displayed as the slide show. The image display screen 3 displays the slide show display screen 37 in response to the press of the slide show button 62d. As described above, the cluster selection screen 36 displays the list of the cluster names 14, each of which is the combination of the second cluster name candidate 31j indicating the shooting status of the image data 13 and the third cluster name candidate 31k indicating the contents of the image data 13. The user can rapidly select the desired cluster just by looking at the cluster name 14. At this time, the user can also select the cluster rapidly by visually recognizing the total number 36b and the amount of time 36d displayed on the cluster selection screen 36 together with the cluster name 14. Moreover, the user can easily display the image data included in the selected cluster as the slide show by operating the remote controller 6.

In FIG. 12B, the slide show display screen 37 displays an icon of the cluster selected by the user as a cluster 37a, displays an icon of the cluster which falls under the upper of the cluster 37a as the cluster 37b, and further displays an icon of the cluster which falls under the upper of the cluster 37b as the cluster 37c. The slide show display screen 37 shows a relationship among the clusters 37a to 37c in a straight line. Thus, the user can recognize that a portion of the cluster 37c is made up of the cluster 37b and a portion of the cluster 37b is made up of the cluster 37a. The slide show display screen 37 displays the cluster 37a selected by the user with the largest size and displays the clusters 37b and 37c smaller than the cluster 37a.

The cluster 37a sequentially displays the image data 13 included in the cluster 37a as the slide show. The cluster 37a also displays the cluster name 14, the total number 36b, and the amount of time 36d of the cluster 37a together with the image data 13. Moreover, the cluster 37a displays the earliest creation date 31f and the earliest creation time 31g of the slide show table 31 as an earliest shooting date and time 37d and similarly displays the latest creation date 31h and the latest creation time 31i as a latest shooting date and time 37e. The user can recognize the period when the image data 13 included in the cluster 37a are taken by confirming the earliest shooting date and time 37d and the latest shooting date and time 37e. Furthermore, the cluster 37a displays the update time 29b and the update date 29c stored in the FAT data 29 of the displayed image data 13 as a current display shooting date and time 37f. The user can recognize the shooting date and time of the image data 13 which is currently displayed as the slide show by confirming the current display shooting date and time 37f.

The cluster 37b displays the cluster name 14, the thumbnail image data 13S, the total number 36b, and the amount of time 36d. In the present preferred embodiment, the thumbnail image data 13S displayed by the cluster 37b is the thumbnail image data 13S of the image data 13 which is created the earliest in the image data 13 included in the cluster 37b, for example. The cluster 37c displays the cluster name 14, the total number 36b, and the amount of time 36d. The user can recognize the contents of the image data 13 included in the clusters 37b and 37c by confirming the cluster name 14, the thumbnail image data 13S, the total number 36b, or the amount of time 36d.

Figure 13:
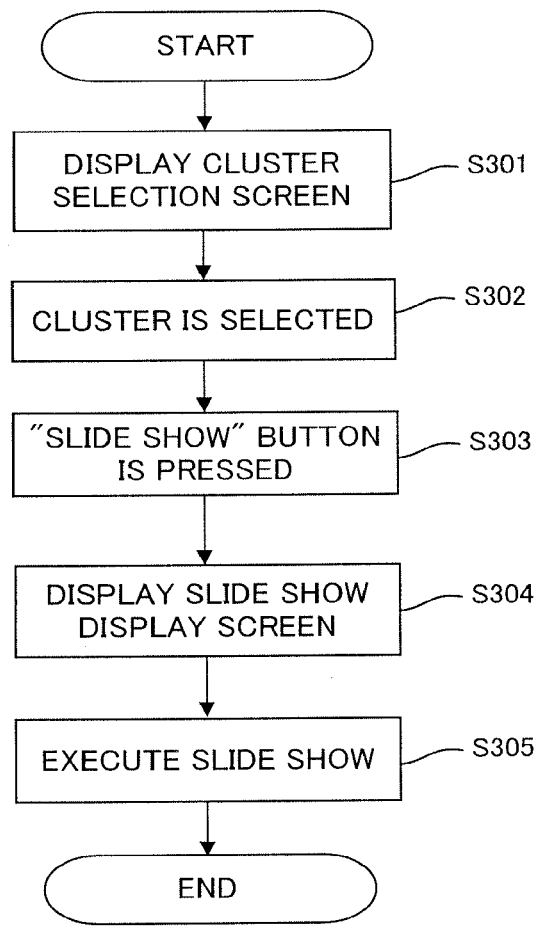
FIG. 13 is a flow chart of a slide show display processing according to the first preferred embodiment.
Figure 14:
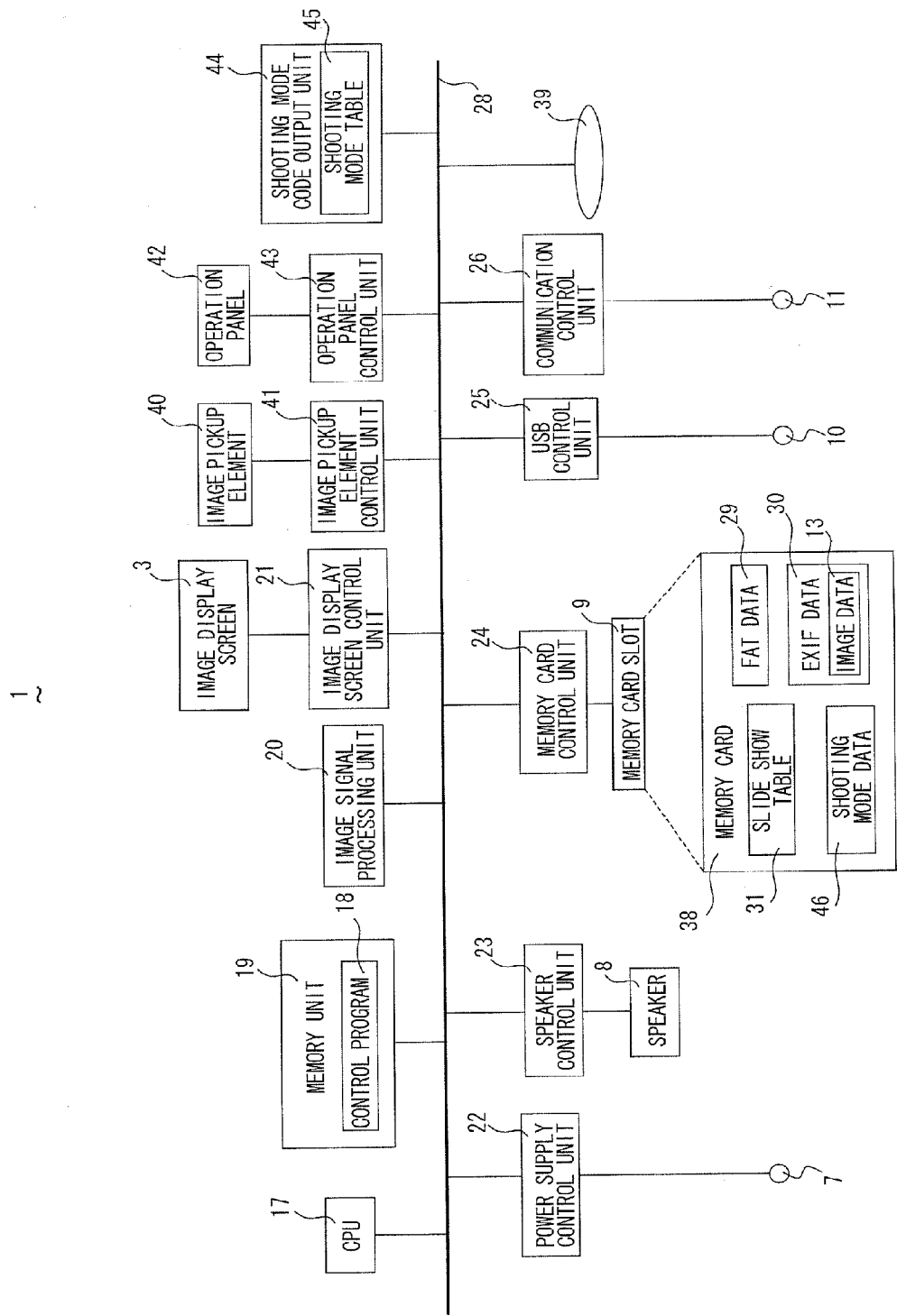
FIG. 14 is a configuration diagram of an image data display system according to a second preferred embodiment of the present invention.

Next, a slide show display processing to display the image data 13 included in the selected cluster as the slide show is described. FIG. 13 shows a flow chart of the slide show display processing. The CPU 17 makes the image display screen 3 display the cluster selection screen 36 in response to the input of the operation command via the remote controller 6 (S301). When the cluster is selected by the user using the remote controller 6 (S302), the CPU 17 makes the cluster selection screen 36 display the selected cluster name display window 36a, the total number display window 36c, and the amount of time display window 36e in the thick-frame pattern. When the slide show button 62d of the remote controller 6 is pressed by the user (S303), the CPU 17 makes the image display screen 3 display the slide show display screen 37 (S304). At this time, the slide show display screen 37 displays the cluster name 14, the total number 36b, and the amount of time 36d together with the image data 13. The CPU 17 sequentially displays all of the image data 13 included in the selected cluster as the slide show (S305) and completes the slide show display processing.

Next, an image data display system 1 according to a second preferred embodiment of the present invention is described with reference to the drawings. The image data display system 1 according to the present preferred embodiment is a digital camera or a mobile phone which can take an image of an object, for example. The image data display system 1 includes a memory card 38 (memory unit) instead of the image data memory unit 27 in the image data display system according to the first preferred embodiment, and further includes a lens 39 and an image pickup element 40 which are used for taking the image of the object, an image pickup element control unit 40 which controls the image pickup element 40, an operation panel 42 which is used for operating the image data display system 1, an operation panel control unit 43 which controls the operation panel 42, and a shooting mode code output unit 44 which outputs a shooting mode, at a time of taking the image of the object, to a CPU 17 as a shooting mode code. In the present preferred embodiment, the shooting mode indicates "macro" which is appropriate to a closeup shot, "person" which is appropriate to a shot of a person, "night view" which is appropriate to a shot of a night view, or the like. The shooting mode code output unit 44 stores a shooting mode table 45 which associatedly stores the shooting mode with the shooting mode code. Since the image data display system 1 is the digital camera or the mobile phone, for example, a screen size of the operation panel 42 is made smaller compared to a digital photo frame, a television, a personal computer, or the like.

The memory card 38 stores an image data 13, a FAT data 29, an Exif data 30, a slide show table 31, and in addition, a shooting mode data 46. The shooting mode data 46 associatedly stores the shooting mode code, which is outputted by the shooting mode code output unit 44, with the image data name of the image data 13. The user sets the shooting mode by operating the operation panel 42 before taking the image of the object. When the image of the object is taken, the shooting mode code output unit 44 outputs the shooting mode code corresponding to the shooting mode set by the user to the CPU 17. The CPU 17 associatedly records the image data name of the image data 13 created by taking the image of the object with the shooting mode code in the shooting mode data 46. Accordingly, the CPU 17 can classify the image data 13 into the cluster based on the shooting mode code.

Next, the shooting mode table 45 stored in the shooting mode code output unit 44 is described. FIG. 15 shows an example of a configuration of the shooting mode table 45. The shooting mode table 45 stores a shooting mode 45a which is made up of mode name such as a pre-set macro, person, night view, or the like and a shooting mode code 45b corresponding to the shooting mode 45a. The shooting mode 45a is classified into a shooting category which corresponds to the shot of the object, an event category which indicates the shooting status such as birthday or athletic festival, for example, and a user setting category which indicates the character string such as Ichiro or dog, for example, which is arbitrarily set by the user. In the present preferred embodiment, the mode name "macro" is associated with a shooting mode code "A100", the mode name "birthday" is associated with a shooting mode code "B100", and the mode name "Ichiro" is associated with a shooting mode code "C100", respectively. When the user selects the mode name "night view" by operating the operation panel 42 and takes the image of the object, the shooting mode code output unit 44 refers to the shooting mode table 45 and outputs the mode name "night view" and a shooting mode code "A102" which is associated with the mode name "night view" to the CPU 17.

Figure 16:
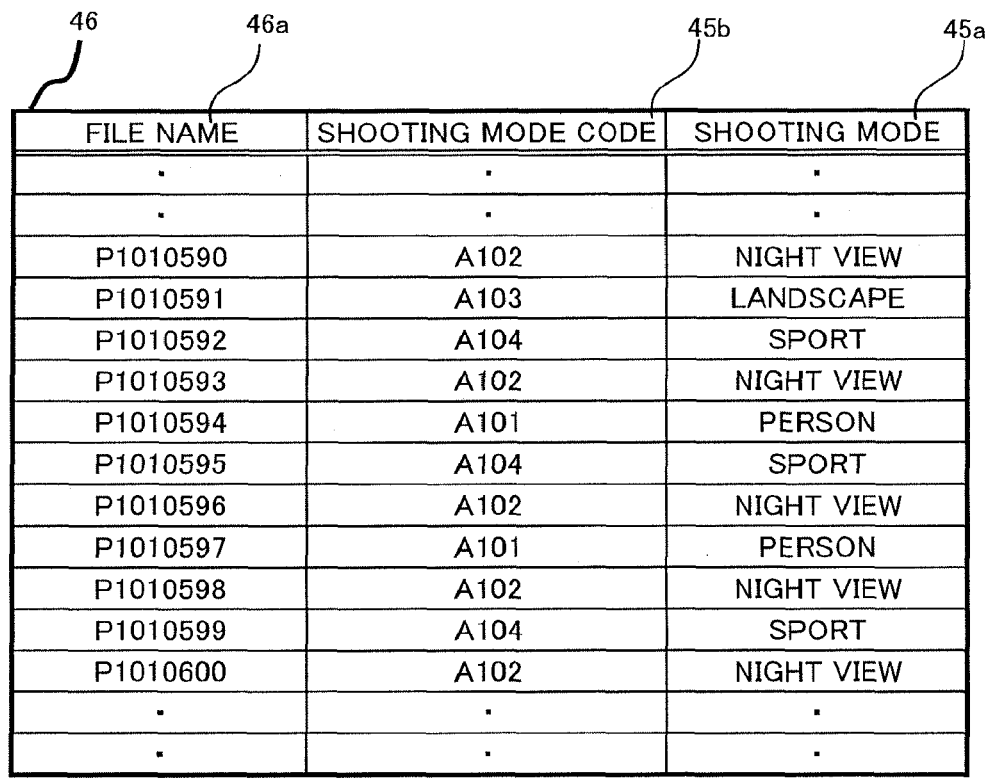
FIG. 16 is a configuration diagram of a shooting mode data according to the second preferred embodiment.

Next, the shooting mode data 46 stored in the memory card 38 is described. FIG. 16 shows an example of a configuration of the shooting mode data 46. The shooting mode data 46 stores a file name 46a which stores the image data name of the image data 13, a shooting mode code 45b which is outputted by the shooting mode code output unit 44, and the shooting mode 45a which is associated with the shooting mode code 45b in the shooting mode table 45. In the present preferred embodiment, the image data name stored in the file name 46a is the image data name stored in the file name 29a in the FAT data 29. Accordingly, the CPU 17 can associate the data stored in the shooting mode data 46 with the data stored in the FAT data 29 and the Exif data 30.

Next, a classification of the image data 13 into the cluster based on the shooting mode code 45b executed by the CPU 17 is described. FIG. 17 shows an example of a configuration of the slide show table 31. In the present preferred embodiment, the sixth cluster to which "6" is provided as the cluster number 31a is described. The sixth cluster is created based on the shooting mode code 45b of "A102" in the shooting mode data 46. Accordingly, the CPU 17 creates the cluster of the image data 13 which are taken with the shooting mode 45a set to "night view". The CPU 17 refers to the shooting mode data 46 and extracts the image data name whose shooting mode code 45b falls under "A102" from the file name 46a. Subsequently, the CPU 17 refers to the file name 29a of the FAT data 29, extracts the image data 13 which falls under the image data name extracted from the file name 46a, and designates the cluster including the extracted image data 13 as the sixth cluster. The CPU 17 records a total number of image data 31e, an earliest creation date 31f, an earliest creation time 31g, a latest creation date 31h, and a latest creation time 31i in the slide show table 31 based on the FAT data 29 of the extracted image data 13.

Since the CPU 17 creates the sixth cluster based on the shooting mode data 46, the CPU 17 records "shooting mode data" in the cluster type 31c. Moreover, the sixth cluster is the logical cluster which is not based on DCF standard, so that the CPU 17 records "nonconform" in a DCF conform/nonconform 31d. The CPU 17 records the set of alpha-numeral characters "400NIGHT", which is the directory name which conforms to the DCF standard and which indicates that the sixth cluster is created based on the mode name "night view", in the first cluster name candidate 31b. At this time, the CPU 17 records the mode name "night view" not in the first cluster name candidate 31b but in the third cluster name candidate 31k. Accordingly, the CPU 17 can record the character string in the third cluster name candidate 31k even when the character string is not inputted by the user as the third cluster name candidate 31k. As described above, the image data display system 1 can classify the image data 13 into the cluster based on the shooting mode 45a in which the image of the object is taken.

Figure 18:
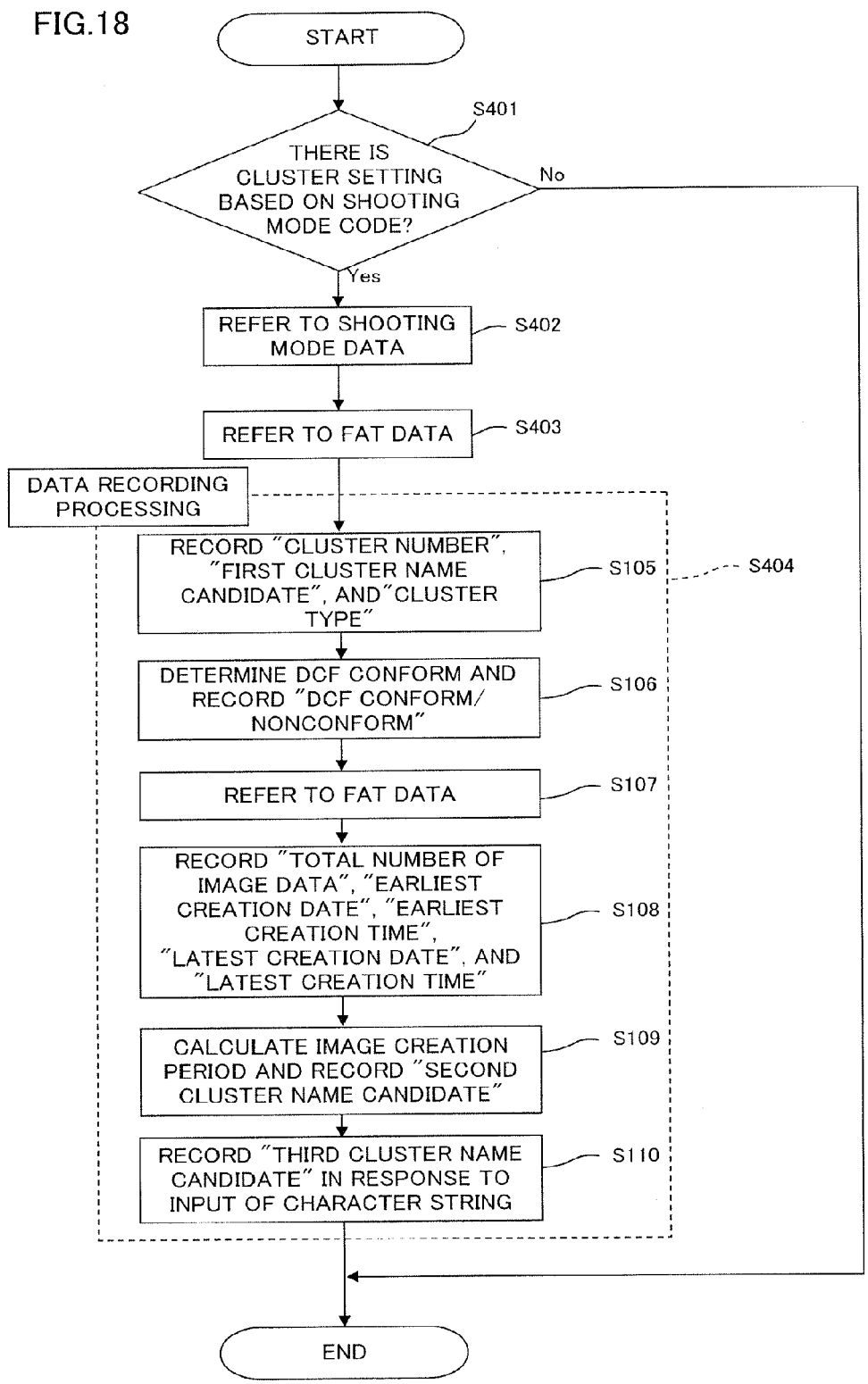
FIG. 18 is a flow chart of a recording processing to record data in the slide show table according to the second preferred embodiment.

Next, a process of recording data in the slide show table 31 based on the shooting mode data 46 executed by the CPU 17 is described. FIG. 18 shows a flow chart of a recording processing to record the data in the slide show table 31. The CPU 17 determines whether or not there is, in advance, the setting to create the cluster based on the shooting mode data 46 (S401). In the present preferred embodiment, the setting to create the cluster based on the shooting mode data 46 is the setting to create the cluster based on the shooting mode code 45b of the shooting mode data 46. When there is no setting to create the cluster based on the shooting mode data 46 in the step S401 (No in S401), the CPU 17 completes the recording processing of the slide show table 31. In contrast, when there is the setting to create the cluster based on the shooting mode data 46 in the step S401 (Yes in S401), the CPU 17 refers to the shooting mode data 46 (S402). The CPU 17 extracts the image data name of the image data 13 which falls under the pre-set condition from the file name 46a of the shooting mode data 46. The CPU 17 refers to the FAT data 29 (S403), creates the cluster based on the image data name extracted from the shooting mode data 46, and executes the data recording processing on the created cluster (S404). In the present preferred embodiment, the data recording processing is the processing from the step S105 to the step S110 in FIG. 9. After executing the data recording processing, the CPU 17 completes the recording processing to record the data in the slide show table 31.

Figures 19A, 19B:
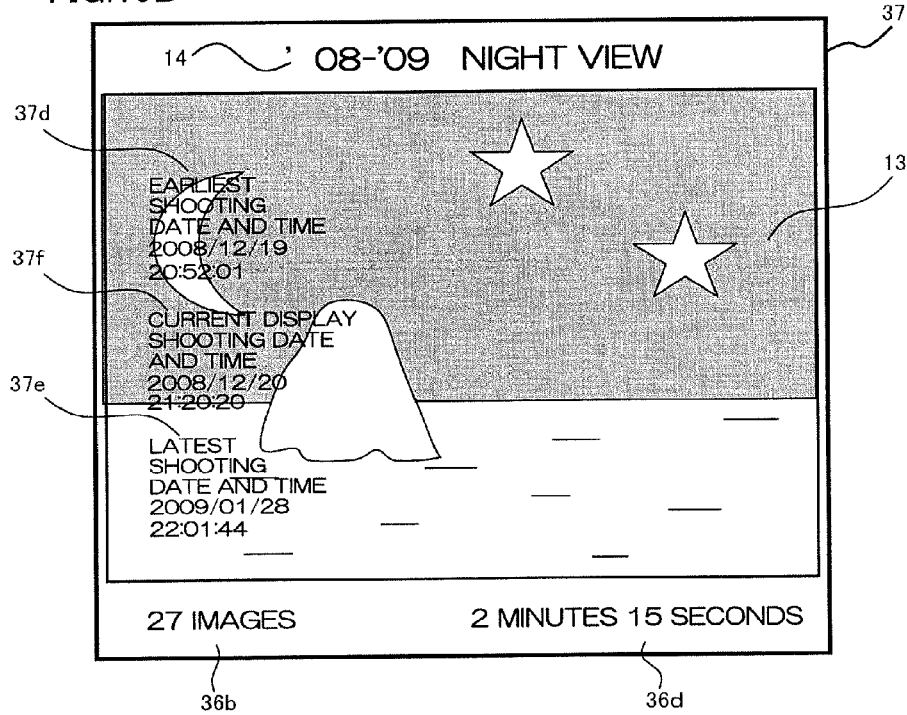
FIGS. 19A and 19B are diagrams showing a process of displaying image data as a slide show according to the second preferred embodiment.

Next, a process of displaying the image data 13 included in the selected cluster as the slide show according to the image data display system 1 of the present preferred embodiment is described. FIGS. 19A and 19B show a process of displaying the image data 13 as the slide show. FIG. 19A shows a cluster selection screen 36 in which the user selects the cluster, and FIG. 19B shows a slide show display screen 37 which displays the image data 13 included in the selected cluster as the slide show. In FIG. 19A, the cluster selection screen 36, which is displayed on the operation panel 42, displays a cluster name display window 36a, a total number display window 36c, and an amount of time display window 36e. The cluster selection screen 36 displays a list of the cluster names 14 by displaying the plurality of the cluster name display windows 36a. In the present preferred embodiment, the operation panel 42 is mounted on the digital camera or the mobile phone, so that a screen size of the operation panel 42 is made smaller compared to a television, a personal computer, or the like. Thus, the operation panel 42 may display only the cluster name display window 36a without displaying the total number display window 36c and the amount of time display window 36e. At this time, preferably, the cluster name display window 36a combinedly displays the second cluster name candidate 31j and the third cluster name candidate 31k as the cluster name 14. Accordingly, the user can easily recognize the shooting status or the contents of the image data 13 by visually recognizing the cluster name 14.

The user selects the cluster to display as the slide show by reference to the list of cluster names 14, the total numbers 36b, and the amount of times 36d displayed on the cluster selection screen 36. The user selects the desired cluster using the remote controller 6. In the present preferred embodiment, the cluster whose cluster name 14 in the sixth line is "'08-'09 night view", the total number 36b is "27", and the amount of time 36d is "2 minutes 15 seconds" is selected. The cluster selection screen 36 displays the selected cluster name display window 36a, the total number display window 36c, and the amount of time display window 36e in the thick-frame pattern. Accordingly, the user can confirm the selected cluster. After selecting the desired cluster, the user presses the slide show button 62d in the second operation key group 62 in the remote controller 6 so that the image data 13 included in the selected cluster are displayed as the slide show. The operation panel 42 displays the slide show display screen 37 in response to the press of the slide show button 62d.

In FIG. 19B, the slide show display screen 37 sequentially displays the image data 13 included in the cluster selected by the user as the slide show. The slide show display screen 37 also displays the cluster name 14, the total number 36b, and the amount of time 36d of the selected cluster together with the image data 13. Moreover, the slide show display screen 37 displays an earliest shooting date and time 37d, a latest shooting date and time 37e, and a current display shooting date and time 37f of the selected cluster. At this time, since the screen size of the operation panel 42 is small, the slide show display screen 37 displays the earliest shooting date and time 37d, the latest shooting date and time 37e, and the current display shooting date and time 37f superimposed on the image data 13. Accordingly, the user can watch the cluster name 14, the total number 36b, the amount of time 36d, the earliest shooting date and time 37d, the latest shooting date and time 37e, and the current display shooting date and time 37f together with the image data 13 even on the operation panel 42 having a small screen size.

The present invention is not limited to the configuration of the above preferred embodiment, however, various modification are applicable, so that the image display screen 3 according to the first preferred embodiment may also have a configuration to include only the first cluster name display window 15 which displays the whole cluster name 14, for example, instead of a configuration to display both the first cluster name display window 15 and the second cluster name display window 16. Moreover, the cluster selection screen 36 according to the second preferred embodiment may also have a configuration to display the cluster name display window 36a, the total number display window 36c, and the amount of time display window 36e superimposed on the image data 13 instead of a configuration to display the cluster name display window 36a, the total number display window 36c, and the amount of time display window 36e without displaying the image data 13.

The invention claimed is:

1. An image data display system, comprising:
   an image data input unit to which image data and attribute information of the image data are inputted;
   an image display screen which displays the image data or the attribute information;
   an input unit to which character information or an operation command is inputted by a user;
   a control unit which controls the image data display system; and
   a memory unit which stores a control computer readable medium to control the image data display system, wherein
   the control unit executes processings of:
   creating a cluster which includes a plurality of the image data based on a directory which stores the image data;
   designating a directory name of the directory as a first cluster name candidate;
   calculating a period when the image data included in the cluster is created as an image creation period based on a creation date and time of the image data and designating the image creation period as a second cluster name candidate;
   designating an arbitrary character string as a third cluster name candidate in response to a provision of the character string to the cluster via the input unit; and
   creating a slide show table which associatedly stores the first cluster name candidate, the second cluster name candidate, and the third cluster name candidate,
   the memory unit stores the slide show table,
   the image display screen executes processings of:
   combinedly displaying any two of the first cluster name candidate, the second cluster name candidate, and the third cluster name candidate stored in the slide show table as a cluster name of the cluster; and
   displaying the image data included in the cluster to which the cluster name is provided as a slide show in response to a selection of the cluster via the input unit,
   and
   the image display screen displays the cluster name and the image data superimposedly or to be adjacent to each other.

2. The image data display system according to claim 1, wherein
   the attribute information is FAT (File Allocation Table) data or Exif (Exchangeable Image File Format) data of the image data, and
   the control unit executes processings of:
   creating the cluster including the plurality of the image data based on a common attribute information in the attribute information;

designating a name which is determined based on the common attribute information as a first cluster name candidate;

calculating the image creation period of the cluster and designating the image creation period as a second cluster name candidate; and designating an arbitrary character string as a third cluster name candidate in response to a provision of the character string to the cluster via the input unit.

3. The image data display system according to claim 1, wherein the image display screen displays a character string input window to which a character string is inputted as the third cluster name candidate, and the control unit makes the slide show table store the inputted character string as the third cluster name candidate in response to an input of the character string to the character string input window via the input unit.

4. The image data display system according to claim 1, wherein the image display screen combinedly displays the second cluster name candidate and the third cluster name candidate stored in the slide show table as the cluster name and displays a list of a plurality of the cluster names.

5. A non-transitory computer-readable medium comprising an image data display program executable by a processor to perform a method of:

creating a cluster which includes a plurality of the image data based on a directory which stores the image data;

designating a directory name of the directory as a first cluster name candidate;

calculating a period when the image data included in the cluster is created as an image creation period based on a creation date and time of the image data and designating the image creation period as a second cluster name candidate;

designating an arbitrary character string as a third cluster name candidate in response to a provision of the character string to the cluster via the input unit;

creating a slide show table which associatedly stores the first cluster name candidate, the second cluster name candidate, and the third cluster name candidate;

storing the slide show table in the memory unit;

combinedly displaying, on the image display screen, any two of the first cluster name candidate, the second cluster name candidate, and the third cluster name candidate stored in the slide show table as a cluster name of the cluster;

displaying the image data included in the cluster to which the cluster name is provided as a slide show in response to a selection of the cluster via the input unit; and displaying the cluster name and the image data superimposedly or to be adjacent to each other.

6. The non-transitory computer-readable medium according to claim 5, wherein the attribute information is FAT data or Exif data of the image data, and the method further comprises:

creating the cluster including the plurality of the image data based on a common attribute information in the attribute information;

designating a name which is determined based on the common attribute information as a first cluster name candidate;

calculating the image creation period of the cluster and designating the image creation period as a second cluster name candidate; and designating an arbitrary character string as a third cluster name candidate in response to a provision of the character string to the cluster via the input unit.

7. The image data display program for the computer according to claim 5, wherein the image data display program makes the image display screen execute a step of displaying a character string input window to which a character string is inputted as the third cluster name candidate, and the image data display program makes the control unit execute a step of making the slide show table store the inputted character string as the third cluster name candidate in response to an input of the character string to the character string input window via the input unit.

8. The image data display program for the computer according to claim 5, wherein the image data display program makes the image display screen execute steps of combinedly displaying the second cluster name candidate and the third cluster name candidate stored in the slide show table as the cluster name and displaying a list of a plurality of the cluster names.

* * * * *